US012143038B2

(12) United States Patent
Matsuyama et al.

(10) Patent No.: US 12,143,038 B2
(45) Date of Patent: Nov. 12, 2024

(54) ROTARY MACHINE CONTROL DEVICE

(71) Applicant: Panasonic Intellectual Property Management Co., Ltd., Osaka (JP)

(72) Inventors: Tetsuya Matsuyama, Nara (JP); Yuya Tanaka, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 194 days.

(21) Appl. No.: 18/073,190

(22) Filed: Dec. 1, 2022

(65) Prior Publication Data

US 2023/0198438 A1 Jun. 22, 2023

(30) Foreign Application Priority Data

Dec. 16, 2021 (JP) .................................. 2021-203816
Dec. 16, 2021 (JP) .................................. 2021-203968
May 26, 2022 (JP) .................................. 2022-085836

(51) Int. Cl.
*H02P 21/30* (2016.01)
*H02P 21/05* (2006.01)
(Continued)

(52) U.S. Cl.
CPC .............. *H02P 21/30* (2016.02); *H02P 21/05* (2013.01); *H02P 21/141* (2013.01); *H02P 21/20* (2016.02); *H02P 21/22* (2016.02); *H02P 2207/05* (2013.01)

(58) Field of Classification Search
CPC ...... H02P 21/30; H02P 2207/05; H02P 21/22; H02P 21/05; H02P 21/141; H02P 21/20
(Continued)

(56) References Cited

U.S. PATENT DOCUMENTS 9,059,653 B2 * 6/2015 Shimada ................. H02P 6/183
2022/0103102 A1 3/2022 Kezobo et al.

FOREIGN PATENT DOCUMENTS

JP 2017108584 A * 6/2017
JP 6206767 B2 10/2017
(Continued)

OTHER PUBLICATIONS

Japanese Notice of Reasons for Refusal dated Jun. 20, 2023, for the corresponding Japanese Patent Application No. 2022-085836, 5 pages. (With English Machine Translation).
(Continued)

*Primary Examiner* — Jorge L Carrasquillo
(74) *Attorney, Agent, or Firm* — Seed IP Law Group LLP

(57) ABSTRACT

A rotary machine control device includes: a magnetization characteristics determiner that determines a magnet phase of a magnet flux based on an estimated magnetic flux and a detection current, and determines a qm-axis magnetic flux of the estimated magnetic flux, a qm-axis current of the detection current, and a harmonic component of a magnet phase using a dm-qm coordinate system with a dm axis representing the magnet phase and a qm axis representing a phase shifted by 90 degrees from the magnet phase; a ripple compensation determiner that determines a ripple compensation phase using a ripple compensation torque obtained based on the qm-axis current and the harmonic component; a command phase determiner that determines a command phase based on the ripple compensation phase and a torque command; and a command magnetic flux generator that generates a command magnetic flux based on a command amplitude and the command phase.

17 Claims, 36 Drawing Sheets

(51) Int. Cl.
    *H02P 21/14*     (2016.01)
    *H02P 21/20*     (2016.01)
    *H02P 21/22*     (2016.01)

(58) Field of Classification Search
    USPC .................................................. 318/400.02
    See application file for complete search history.

(56) References Cited

FOREIGN PATENT DOCUMENTS

| | | | |
|---|---|---|---|
| JP | 2017225233 A | * | 12/2017 |
| JP | 2018014814 A | * | 1/2018 |
| JP | 6473992 B2 | * | 2/2019 |
| JP | 6641051 B1 | | 2/2020 |
| JP | 2020178429 A | | 10/2020 |
| JP | 2021136806 A | | 9/2021 |

OTHER PUBLICATIONS

Inoue et al., "Torque Ripple Reduction Based on Direct Torque Control for an Interior Permanent Magnet Synchronous Motor with Harmonies," 2006 IEE Japan Industry Applications Society Conference, pp. 173-176. (with English Translation).

Terayama et al., Torque Ripple Suppression Control in PMSM Using Estimated Harmonic Component of Flux Linkage Considering Magnetic Saturation, *IEEJ Transactions on Industry Applications* 141(4):366-373, 2021. (with English Translation).

\* cited by examiner

| $i_{qm}$ | $i_0$ | ... | $i_k$ | ... | $i_{max}$ |
|---|---|---|---|---|---|
| $W'_{qmcn}$ | $W'_{c0}$ | ... | $W'_{ck}$ | ... | $W'_{cmax}$ |

(b)

| $i_{qm}$ | $i_0$ | ... | $i_k$ | ... | $i_{max}$ |
|---|---|---|---|---|---|
| $W'_{qmsn}$ | $W'_{s0}$ | ... | $W'_{sk}$ | ... | $W'_{smax}$ |

ROTARY MACHINE CONTROL DEVICE

CROSS REFERENCE TO RELATED APPLICATIONS

The present application is based on and claims priority of Japanese Patent Application No. 2021-203816 filed on Dec. 16, 2021, Japanese Patent Application No. 2021-203968 filed on Dec. 16, 2021, and Japanese Patent Application No. 2022-085836 filed on May 26, 2022.

FIELD

The present disclosure relates to a rotary machine control device that controls a rotary machine.

BACKGROUND

Conventionally, as a method for driving a synchronous rotary machine (synchronous motor), position sensorless magnetic flux control that uses direct torque control (DTC) has been known. The position sensorless magnetic flux control is disclosed in, for example, Patent Literature (PTL) 1.

Also, conventionally, a torque ripple reduction method and the like have been known. The torque ripple reduction method is disclosed in, for example, Non Patent Literatures (NPLs) 1 and 2.

CITATION LIST

Patent Literature

PTL 1: Japanese Unexamined Patent Application Publication No. 2020-178429

Non Patent Literature

NPL 1: Yukinori Inoue, Shigeo Morimoto, and Masayuki Sanada, "Torque Ripple Reduction Based on Direct Torque Control for an Interior Permanent Magnet Synchronous Motor with Harmonics", 2006 IEE Japan Industry Applications Society Conference, 1-4, pp. 173-176

NPL 2: Yuki Terayama and Nobukazu Hoshi, "Torque Ripple Suppression Control in PMSM Using Estimated Harmonic Component of Flux Linkage Considering Magnetic Saturation", IEEJ Journal of Industry Applications, Vol. 141, No. 4, pp. 366-373

SUMMARY

However, the techniques disclosed in PTL 1 and NPLs 1 and 2 described above can be improved upon.

In view of the above, the present disclosure provides a rotary machine control device capable of improving upon the above related art.

A rotary machine control device according to an aspect of the present disclosure includes: a magnetic flux estimator that estimates a rotary machine magnetic flux that is a magnetic flux of a synchronous rotary machine; a command amplitude generator that generates a command amplitude that is an amplitude of a command magnetic flux by executing feedback control that uses a first inner product or a second inner product, the first inner product being a product of an estimated magnetic flux that is the rotary machine magnetic flux estimated and a detection current of the synchronous rotary machine, the second inner product being a product of the detection current and an estimated magnet flux of a permanent magnet included in the synchronous rotary machine; a magnetization characteristics determiner that determines a magnet phase that is a phase of the magnet flux based on the estimated magnetic flux and the detection current, and also determines a qm-axis magnetic flux of the estimated magnetic flux, a qm-axis current of the detection current, and a harmonic component of the magnet phase by using a dm-qm coordinate system with a dm axis representing the magnet phase and a qm axis representing a phase shifted by 90 degrees from the magnet phase; a ripple compensation determiner that determines a ripple compensation phase by using a ripple compensation torque obtained based on the qm-axis current and the harmonic component; a command phase determiner that determines a command magnetic flux vector phase based on (i) the ripple compensation phase and (ii) a torque command or a rotation speed command; and a command magnetic flux generator that generates the command magnetic flux based on the command amplitude and the command magnetic flux vector phase.

A rotary machine control device according to an aspect of the present disclosure includes: a magnetic flux estimator that estimates a rotary machine magnetic flux that is a magnetic flux of a synchronous rotary machine;
  a command amplitude generator that generates a command amplitude that is an amplitude of a command magnetic flux by executing feedback control that uses a first inner product or a second inner product, the first inner product being a product of an estimated magnetic flux that is the rotary machine magnetic flux estimated and a detection current of the synchronous rotary machine, the second inner product being a product of the detection current and an estimated magnet flux of a permanent magnet included in the synchronous rotary machine; a magnetization characteristics determiner that determines a magnet phase that is a phase of the magnet flux based on the estimated magnetic flux and the detection current, and also determines a qm-axis magnetic flux of the estimated magnetic flux, a qm-axis current of the detection current, and a harmonic component of the magnet phase by using a dm-qm coordinate system with a dm axis representing the magnet phase and a qm axis representing a phase shifted by 90 degrees from the magnet phase; a ripple compensation determiner that determines a ripple compensation torque based on the qm-axis current and the harmonic component; a command phase determiner that determines a command magnetic flux vector phase based on (i) the ripple compensation phase and (ii) a torque command or a rotation speed command, the ripple compensation phase being determined by a resonator based on the ripple compensation torque; and a command magnetic flux generator that generates the command magnetic flux based on the command amplitude and the command magnetic flux vector phase.

A rotary machine control device according to an aspect of the present disclosure includes: a magnetic flux estimator that estimates a rotary machine magnetic flux that is a magnetic flux of a synchronous rotary machine; a command amplitude generator that generates a command amplitude that is an amplitude of a command magnetic flux by executing feedback control that uses a first inner product or a second inner product, the first inner product being a product of an estimated magnetic flux that is the rotary machine magnetic flux estimated and a detection current of the synchronous rotary machine, the second inner product being a product of the detection current and an estimated magnet flux of a permanent magnet included in the synchronous rotary machine; a ripple compensation determiner that determines a magnet phase that is a phase of the magnet flux based on the estimated magnetic flux and the detection current, and also determines a ripple compensation phase by using a resonator based on a ripple compensation torque that includes a pulsation of a qm-axis current of the detection current by using a dm-qm coordinate system with a dm axis representing the magnet phase and a qm axis representing a phase shifted by 90 degrees from the magnet phase; a command phase determiner that determines a command magnetic flux vector phase based on (i) the ripple compensation phase and (ii) a torque command or a rotation speed command; and a command magnetic flux generator that generates the command magnetic flux based on the command amplitude and the command magnetic flux vector phase.

The rotary machine control devices according to the aspects of the present disclosure are capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 7 is a diagram showing a magnetic energy table generated by the magnetization characteristics determiner shown in FIG. 5.

DESCRIPTION OF EMBODIMENTS

Hereinafter, specific examples of rotary machine control devices according to aspects of the present disclosure will be described with reference to the drawings. The embodiments described in the specification of the present application show specific examples of the present disclosure. Accordingly, the numerical values, shapes, structural elements, the arrangement and connection of the structural elements, steps, the order of the steps, and the like shown in the following embodiments are merely examples, and therefore are not intended to limit the scope of the present disclosure. In addition, the diagrams are schematic representations, and thus are not necessarily true to scale.

General and specific aspects of the present disclosure may be implemented using a system, a method, an integrated circuit, a computer program, or a computer-readable recording medium such as a CD-ROM, or any combination of systems, methods, integrated circuits, computer programs, or computer-readable recording media.

Embodiment 1

Figure 1:
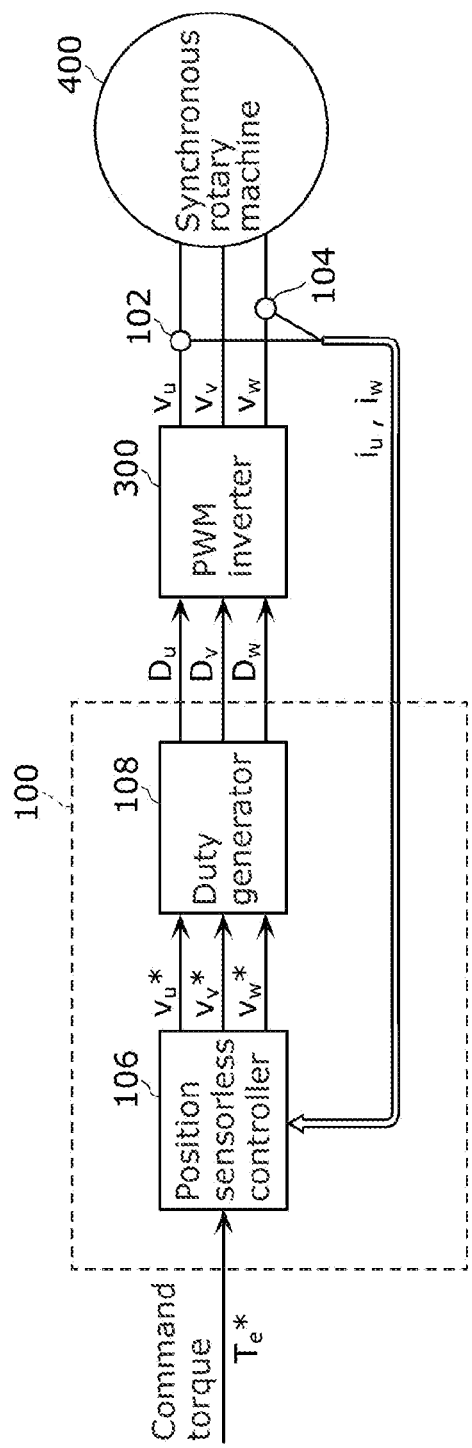
FIG. 1 is a block diagram of a rotary machine control device and the like according to Embodiment 1.

As shown in FIG. 1, rotary machine control device 100 includes first current sensor 102, second current sensor 104, position sensorless controller 106, and duty generator 108. Rotary machine control device 100 is connected to PWM (Pulse Width Modulation) inverter 300 and synchronous rotary machine 400.

Position sensorless controller 106 performs position sensorless magnetic flux control on synchronous rotary machine 400. Position sensorless controller 106 is configured to execute a position sensorless magnetic flux control operation for synchronous rotary machine 400. In the present embodiment, during a period in which the position sensorless magnetic flux control operation is performed, the rotation speed (the number of rotations) of a rotor of synchronous rotary machine 400 matches the rotation speed (synchronous speed) of a rotary machine current that is applied to synchronous rotary machine 400. The position sensorless magnetic flux control operation is an operation performed without using an encoder and a position sensor such as a resolver. In the specification of the present application, for the sake of convenience of the description, an operation of controlling a rotary machine magnetic flux by using the phase of an estimated rotary machine magnetic flux will be referred to as a "magnetic flux control operation". The rotary machine magnetic flux conceptually includes both an armature interlinkage magnetic flux on a three-phase AC coordinate that is applied to synchronous rotary machine 400 and a magnetic flux obtained by coordinate converting the armature interlinkage magnetic flux. In the specification of the present application, the term "amplitude" may also simply refer to a magnitude (absolute value).

Some or all of the structural elements of rotary machine control device 100 may be provided by a control application executed by a DSP (Digital Signal Processor) or a microcomputer. The DSP or the microcomputer may include a core, a memory, an A/D conversion circuit, and peripheral devices such as a communication port. Also, some or all of the structural elements of rotary machine control device 100 may be configured using a logic circuit.

(Overview of Control of Rotary Machine Control Device 100)

Rotary machine control device 100 generates duties $D_u$, $D_v$, and $D_w$ from command torque $T_e^*$ and phase currents $i_u$ and $i_w$. Voltage vectors $v_u$, $v_v$, and $v_w$ to be applied to synchronous rotary machine 400 are generated from duties $D_u$, $D_v$, and $D_w$ by PWM inverter 300. Command torque $T_e^*$ is input from an upper control device to rotary machine control device 100. Command torque $T_e^*$ represents a torque to be followed by a motor torque.

Hereinafter, an overview of an operation performed by rotary machine control device 100 will be described. Phase currents $i_u$ and $i_w$ are detected by current sensors 102 and 104 (first current sensor 102 and second current sensor 104). During the operation of the position sensorless magnetic flux control operation, command voltage vectors $v_u^*$, $v_v^*$, and $v_w^*$ are generated from command torque $T_e^*$ and phase currents $i_u$ and $i_w$ by position sensorless controller 106. The components of command voltage vectors $v_u^*$, $v_v^*$, and $v_w^*$ correspond to a U-phase voltage, a V-phase voltage, and a W-phase voltage on the three-phase AC coordinate, respectively. Duties $D_u$, $D_v$, and $D_w$ are generated from command voltage vectors $v_u^*$, $v_v^*$, and $v_w^*$ by duty generator 108. Duties $D_u$, $D_v$, and $D_w$ are input to PWM inverter 300. By performing control as described above, synchronous rotary machine 400 is controlled such that the torque follows command torque $T_e^*$.

Figure 2:
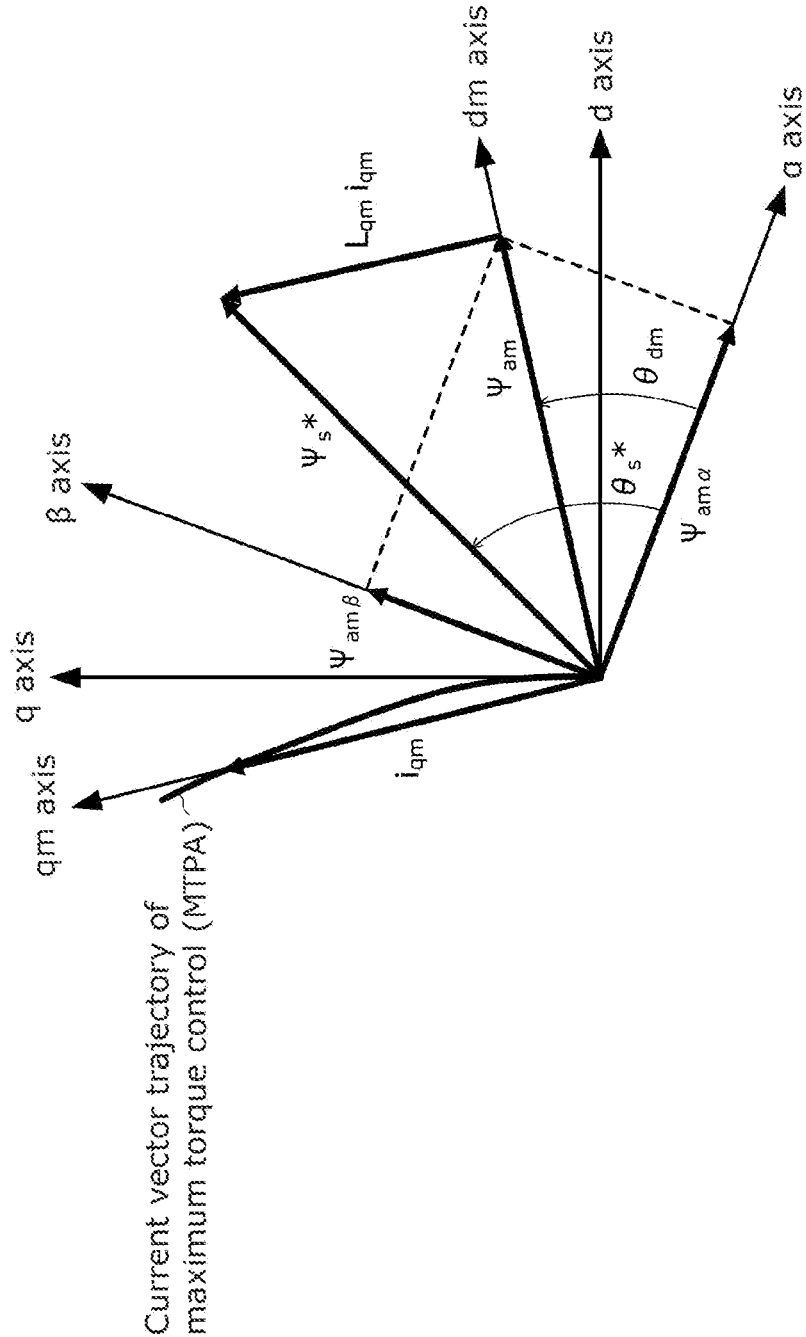
FIG. 2 is a diagram illustrating a α-β coordinate system, a d-q coordinate system, and a dm-qm coordinate system.

Hereinafter, rotary machine control device 100 may be described based on a α-β coordinate system. Also, rotary machine control device 100 may also be described based on a d-q coordinate system. Also, rotary machine control device 100 may also be described based on a dm-qm coordinate system. FIG. 2 shows the α-β coordinate system, the d-q coordinate system, and the dm-qm coordinate system. The α-β coordinate system is a fixed coordinate system. The α-β coordinate system may also be called a stationary coordinate system or an AC coordinate system. The α axis is set as the axis extending in the same direction as a U axis (not shown in FIG. 2). The U axis corresponds to U-phase winding of rotary machine control device 100. The β axis is orthogonal to the α axis. The d-q coordinate system is a rotating coordinate system. The d-q coordinate system is a coordinate system with the d axis representing the phase of the rotor of synchronous rotary machine 400 and the q axis representing a phase shifted by 90 degrees from the phase of the rotor of synchronous rotary machine 400. The dm-qm coordinate system is a rotating coordinate system. The dm-qm coordinate system is a coordinate system with the dm axis representing magnet phase $\theta_{dm}$ that is the phase of magnet flux $\Psi_{am}$ that is an estimated magnetic flux of a permanent magnet included in synchronous rotary machine 400 and the qm axis representing a phase shifted by 90 degrees from magnet phase $\theta_{dm}$.

(Position Sensorless Controller 106)

Referring back to FIG. 1, position sensorless controller 106 performs the position sensorless magnetic flux control operation to set a command amplitude such that the amplitude of the rotary machine magnetic flux converges on a target amplitude. The position sensorless magnetic flux control operation is performed by referencing command phase $\theta_s^*$ determined from the phase (estimated phase $\theta_s$) of the rotary machine magnetic flux estimated based on magnetic flux estimator 112 (described later). The target amplitude is an amplitude to be finally reached by the amplitude of the rotary machine magnetic flux. The command amplitude is an amplitude to be followed by the amplitude of the rotary machine magnetic flux.

Figure 3:
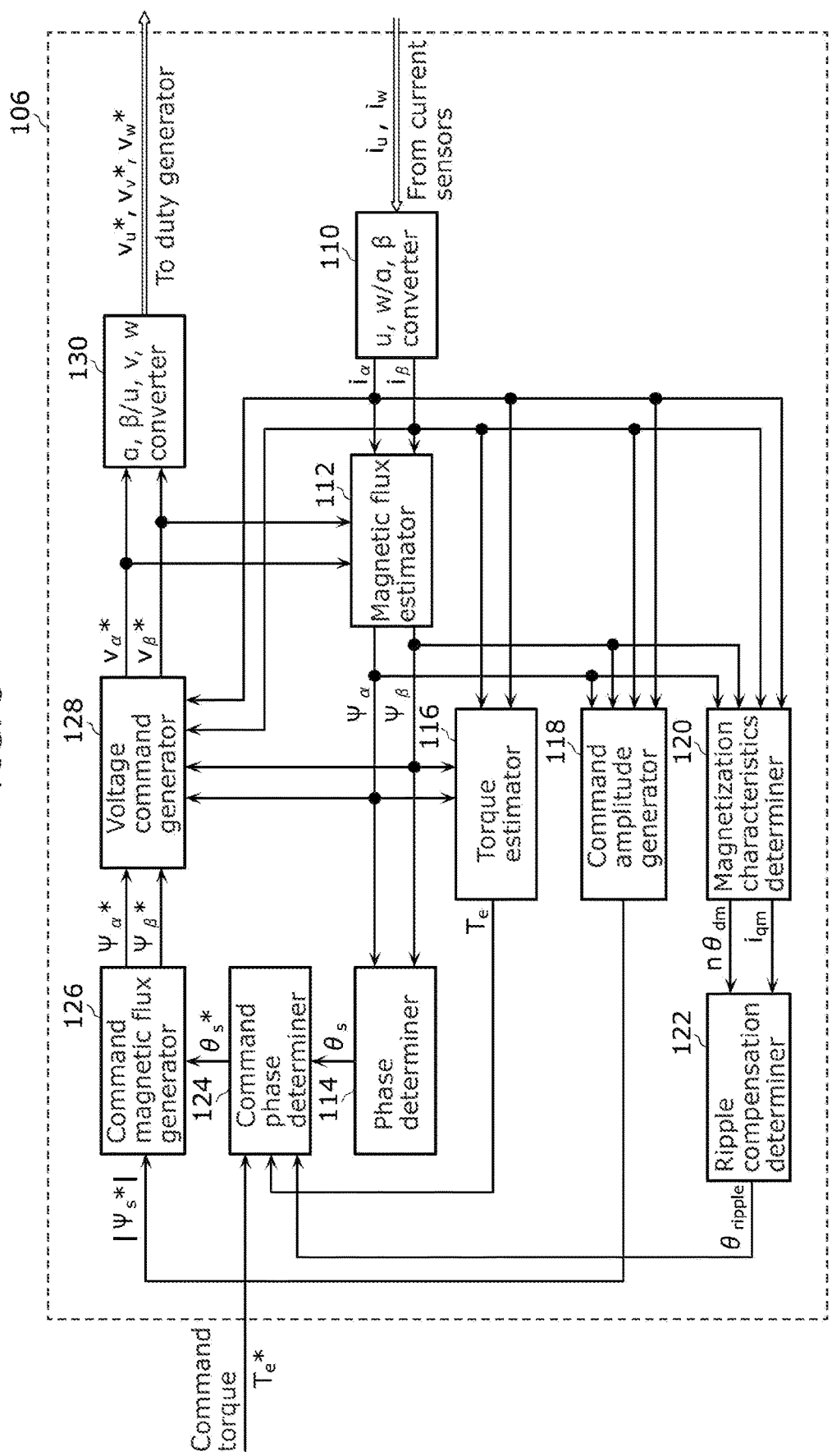
FIG. 3 is a block diagram of a position sensorless controller included in the rotary machine control device shown in FIG. 1.

As shown in FIG. 3, position sensorless controller 106 includes u, w/α, β converter 110, magnetic flux estimator 112, phase determiner 114, torque estimator: 116, command amplitude generator 118, magnetization characteristics determiner 120, ripple compensation determiner 122, command phase determiner 124, command magnetic flux generator 126, voltage command generator 128, and α, β/u, v, w converter 130.

In position sensorless controller 106, phase currents $i_u$ and $i_w$ are converted to axis currents $i_\alpha$ and $i_\beta$ by u, w/α, β converter 110. The expression "axis currents $i_\alpha$ and $i_\beta$" is a collective expression for α-axis current $i_\alpha$ and β-axis current $i_\beta$ on the α-β coordinate system of synchronous rotary machine 400. The rotary machine magnetic flux is estimated (estimated magnetic flux $\Psi_s$ is determined) by magnetic flux estimator 112. The α-axis component and the ß-axis component of estimated magnetic flux $\Psi_s$ will be referred to as "estimated magnetic flux $\Psi_\alpha$" and "estimated magnetic flux $\Psi_\beta$", respectively. The phase of the rotary machine magnetic flux is estimated (estimated phase $\theta_s$ of estimated magnetic flux $\Psi_s$ is determined) from estimated magnetic flux $\Psi_s$ by phase determiner 114. The motor torque is estimated (estimated torque $T_e$ is determined) from estimated magnetic flux $\Psi_s$ and axis currents $i_\alpha$ and $i_\beta$ by torque estimator 116. Command amplitude $|\Psi_s^*|$ is generated from estimated magnetic flux $\Psi_s$ and axis currents $i_\alpha$ and $i_\beta$ by command amplitude generator 118. Here, qm-axis current $i_{qm}$ and harmonic component $n\theta_{dm}$ of magnet phase $\theta_{dm}$ are determined from estimated magnetic flux $\Psi_s$ and axis currents $i_\alpha$ and $i_\beta$ by magnetization characteristics determiner 120. Ripple compensation phase $\theta_{ripple}$ is determined from qm-axis current $i_{qm}$ and harmonic component $n\theta_{dm}$ by ripple compensation determiner 122. Command phase (command magnetic flux vector phase) $\theta_s^*$ of command magnetic flux vector $\Psi_s^*$ is determined from estimated phase $\theta_s$ of estimated magnetic flux $\Psi_s$, command torque $T_e^*$, estimated torque $T_e$, and ripple compensation phase $\theta_{ripple}$ by command phase determiner 124. Command magnetic flux vector $\Psi_s^*$ is determined from command amplitude $|\Psi_s^*|$ and command phase $\theta_s^*$ by command magnetic flux generator 126. The α-axis component and the β-axis component of command magnetic flux vector $\Psi_s^*$ will be referred to as "α-axis command magnetic flux $\Psi_\alpha^*$" and "β-axis command magnetic flux $\Psi_\beta^*$", respectively. Command axis voltages $v_\alpha^*$ and $v_\beta^*$ are determined from command magnetic fluxes $\Psi_\alpha^*$ and $\Psi_\beta^*$, estimated magnetic fluxes $\Psi_\alpha$ and $\Psi_\beta$, and axis currents $i_\alpha$ and $i_\beta$ by voltage command generator 128. The expression "command axis voltages $v_\alpha^*$ and $v_\beta^*$" is a collective expression for α-axis command axis voltage $v_\alpha^*$ and β-axis command axis voltage $v_\alpha^*$ on the α-β coordinate system of synchronous rotary machine 400. Command axis voltages $v_\alpha^*$ and $v_\beta^*$ are converted to command voltage vectors $v_u^*$, $v_v^*$, and $v_w^*$ by α, β/u, v, w converter 130.

In the position sensorless magnetic flux control operation, by performing control as described above, the motor torque follows command torque $T_e^*$, and the rotary machine magnetic flux follows command magnetic flux vector $\Psi_s^*$. As a result, the speed of synchronous rotary machine 400 follows command speed $\omega_{ref}^*$. In the case where the expression "position sensorless controller 106 performs the position sensorless magnetic flux control operation to set a command amplitude such that the amplitude of the rotary machine magnetic flux converges on a target amplitude" described above is used, the target amplitude corresponds to command amplitude $|\Psi_s^*|$. By taking this into consideration, in the following description, command amplitude $|\Psi_s^*|$ may also be referred to as "target amplitude $|\Psi_s^*|$".

In the specification of the present application, axis currents $i_\alpha$ and $i_\beta$ mean current values that are transmitted as information, rather than electric currents that actually flow through synchronous rotary machine 400. Command axis voltages $v_\alpha^*$ and $v_\beta^*$, estimated magnetic flux $\Psi_s$, estimated phase $\theta_s$, command phase $\theta_s^*$, estimated torque $T_e$, command torque $T_e^*$, command amplitude $|\Psi_s^*|$ (target amplitude $|\Psi_s^*|$), command magnetic flux vector $\Psi_s^*$, command voltage vectors $v_u^*$, $v_v^*$, and $v_w^*$, command speed $\omega_{ref}^*$, magnet phase $\theta_{dm}$, harmonic component $n\theta_{dm}$, qm-axis current $i_{qm}$, and the like also mean values that are transmitted as information.

The structural elements of position sensorless controller 106 shown in FIG. 3 will be described below.

(u, w/α, β Converter 110)

u, w/α, β converter 110 converts phase currents $i_u$ and $i_w$ to axis currents $i_\alpha$ and $i_\beta$. Specifically, u, w/α, β converter 110 converts phase currents $i_u$ and $i_w$ to axis currents $i_\alpha$ and $i_\beta$ by using Equation (1) and Equation (2), and outputs axis currents $i_\alpha$ and $i_\beta$.

[Math. 1]
$$i_\alpha = \sqrt{\frac{3}{2}} i_u \tag{1}$$

[Math. 2]
$$i_\beta = -\frac{1}{\sqrt{2}} i_u - \sqrt{2} i_w \tag{2}$$

(Magnetic Flux Estimator 112)

Magnetic flux estimator 112 estimates the rotary machine magnetic flux that is the magnetic flux of synchronous rotary machine 400, and outputs estimated magnetic flux $\Psi_s$ (estimated magnetic fluxes $\Psi_\alpha$ and $\Psi_\beta$) that is the estimated rotary machine magnetic flux. During the operation of the position sensorless magnetic flux control operation, magnetic flux estimator 112 determines estimated magnetic flux $\Psi_s$ from axis currents $i_\alpha$ and $i_\beta$ and command axis voltages $v_\alpha^*$ and $v_\alpha^*$. Specifically, magnetic flux estimator 112 determines estimated magnetic fluxes $\Psi_\alpha$ and $\Psi_\beta$ by using Equation (3) and Equation (4). In Equation (3) and Equation (4), $\Psi_{\alpha|t=0}$ and $\Psi_{\beta|t=0}$ are initial values of estimated magnetic fluxes $\Psi_\alpha$ and $\Psi_\beta$, respectively. In Equation (3) and Equation (4), R represents the winding resistance of the winding resistance of synchronous rotary machine 400. In the case where magnetic flux estimator 112 is included in a digital control device such as a DSP or a microcomputer, a discrete integrator may be used as the integrator required to perform computation in Equation (3) and Equation (4). In this case, a value derived from the current control cycle may be added or subtracted with respect to estimated magnetic fluxes $\Psi_\alpha$ and $\Psi_\beta$ of the previous control cycle.

[Math. 3]
$$\Psi_\alpha = \int (v_\alpha^* - Ri_\alpha) dt + \Psi_{\alpha|t=0} \tag{3}$$

[Math. 4]
$$\Psi_\beta = \int (v_\beta^* - Ri_\beta) dt + \Psi_{\beta|t=0} \tag{4}$$

(Phase Determiner 114)

Phase determiner 114 determines estimated phase $\theta_s$ that is the phase of estimated magnetic flux $\Psi_s$ based on estimated magnetic flux $\Psi_s$ (estimated magnetic fluxes $\Psi_\alpha$ and $\Psi_\beta$). In the present embodiment, phase determiner 114 determines estimated phase $\theta_s$ from estimated magnetic flux $\Psi_s$. Specifically, phase determiner 114 determines estimated phase $\theta_s$ from estimated magnetic flux $\Psi_s$ by using Equation (5). For example, phase determiner 114 is a known phase estimator device.

[Math. 5]

$$\theta_s = \tan^{-1}(\Psi_\beta/\Psi_\alpha) \tag{5}$$

(Torque Estimator 116)

Torque estimator 116 computes estimated torque $T_e$ based on estimated magnetic flux $\Psi_s$ (estimated magnetic fluxes $\Psi_\alpha$ and $\Psi_\beta$) and detection current i. In the present embodiment, detection current i means axis currents $i_\alpha$ and $i_\beta$, and torque estimator 116 determines estimated torque $T_e$ from estimated magnetic flux $\Psi_s$ and axis currents $i\alpha$ and $i_\beta$. Specifically, torque estimator 116 determines estimated torque $T_e$ from estimated magnetic flux $\Psi_s$ and axis currents $i_\alpha$ and $i_\beta$ by using Equation (6). In Equation (6), P represents the number of pole pairs of synchronous rotary machine 400.

[Math. 6]

$$T_e = P(\Psi_\alpha i_\beta - \Psi_\beta i_\alpha) \tag{6}$$

(Command Amplitude Generator 118)

Figure 4:
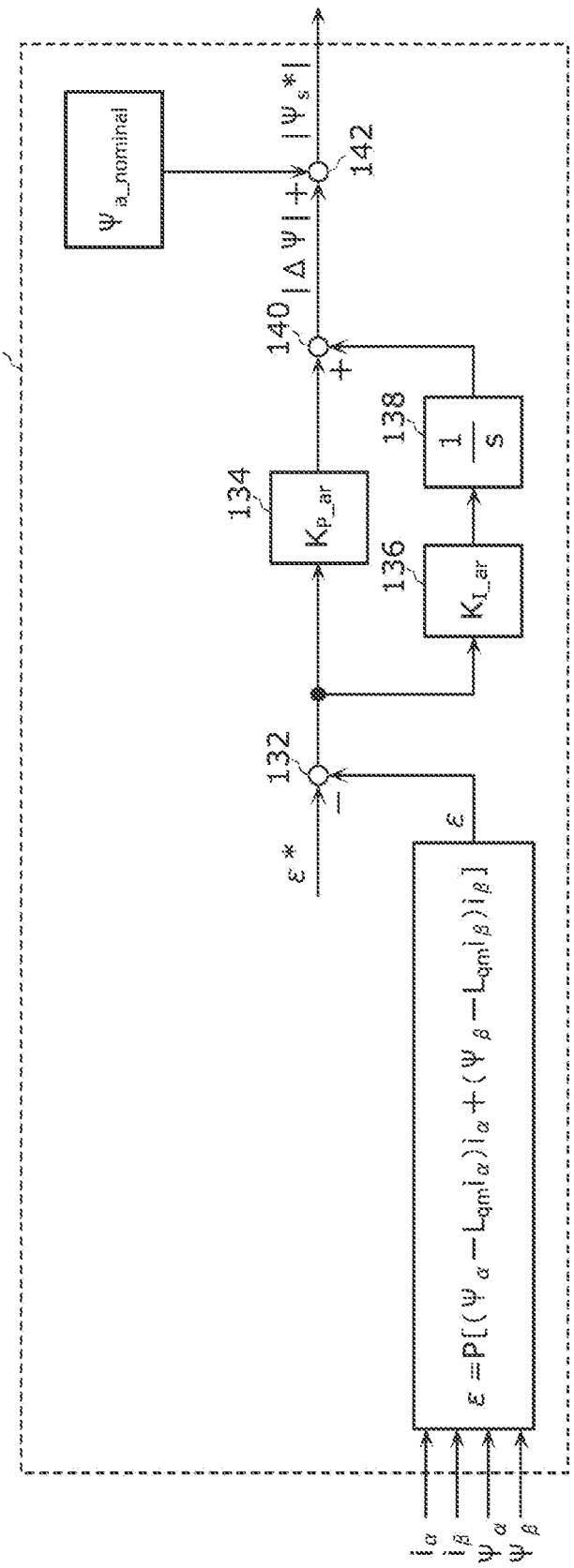
FIG. 4 is a block diagram of a command amplitude generator included in the position sensorless controller shown in FIG. 3.

Command amplitude generator 118 generates command amplitude $|\Psi_s^*|$ that is the amplitude of command magnetic flux by executing feedback control that uses a first inner product or a second inner product, the first inner product being a product of estimated magnetic flux $\Psi_s$ (estimated magnetic fluxes $\Psi_\alpha$ and $\Psi_\beta$) that is the estimated rotary machine magnetic flux and detection current i of synchronous rotary machine 400, the second inner product being a product of detection current i and estimated magnet flux $\Psi_{am}$ of the permanent magnet included in synchronous rotary machine 400. As shown in FIG. 4, in the present embodiment, command amplitude generator 118 generates command amplitude $|\Psi_s^*|$ by executing feedback control that uses the second inner product.

Command amplitude generator 118 computes error variable ε that indicates a reactive power component by using virtual inductance (the inductance of synchronous rotary machine 400) $L_{qm}$, axis currents $i_\alpha$ and $i_\beta$, and estimated magnetic flux $\Psi_s$ (estimated magnetic fluxes W. and $\Psi_\beta$). Specifically, first, command amplitude generator 118 estimates an armature reaction magnetic flux (determines estimated armature reaction magnetic flux $L_{qm}i$). The α-axis component and the β-axis component of estimated armature reaction magnetic flux $L_{qm}i$ will be referred to as "estimated armature reaction magnetic flux $L_{qm}i_\alpha$" and "estimated armature reaction magnetic flux $L_{qm}i_\beta$", respectively. Estimated armature reaction magnetic flux $L_{qm}i_\alpha$ is a product of virtual inductance $L_{qm}$ and axis current $i_\alpha$, and estimated armature reaction magnetic flux $L_{qm}i_\beta$ is a product of virtual inductance Lam and axis current $i_\beta$. Next, command amplitude generator 118 determines estimated magnet flux $\Psi_{am}$ of the permanent magnet of synchronous rotary machine 400 from estimated magnetic flux $\Psi_s$ (estimated magnetic fluxes $\Psi_\alpha$ and $\Psi_\beta$) and estimated armature reaction magnetic flux $L_{qm}i$ (estimated armature reaction magnetic fluxes $L_{qm}i_\alpha$ and $L_{qm}i_\beta$). The α-axis component and the β-axis component of magnet flux $\Psi_{am}$ will be referred to as "estimated magnet flux $\Psi_{am\alpha}$" and "estimated magnet flux $\Psi_{am\beta}$", respectively.

Specifically, as shown in Equation (7), command amplitude generator 118 determines magnet flux $\Psi_{am\alpha}$ by subtracting estimated armature reaction magnetic flux $L_{qm}i_\alpha$ from estimated magnetic flux $\Psi_\alpha$. Also, as shown in Equation (8), command amplitude generator 118 determines magnet flux $\Psi_{am\beta}$ by subtracting estimated armature reaction magnetic flux $L_{qm}i_\beta$ from estimated magnetic flux $\Psi_\beta$. Next, command amplitude generator 118 calculates error variable & from magnet fluxes $\Psi_{am\alpha}$ and $\Psi_{am\beta}$ and axis currents $i_\alpha$ and $i_\beta$ as shown in Equation (9).

[Math. 7]

$$\Psi_{am\alpha} = \Psi_\alpha - L_{qm}i_\alpha \tag{7}$$

[Math. 8]

$$\Psi_{am\beta} = \Psi_\beta - L_{qm}i_\beta \tag{8}$$

[Math. 9]

$$\varepsilon = P(\Psi_{am\alpha}i_\alpha + \Psi_{am\beta}i_\beta) \tag{9}$$

As shown in Equation (9) and FIG. 4, command amplitude generator 118 computes, as error variable E, an inner product (second inner product) of estimated magnet flux $\Psi_{am}$ of the permanent magnet of synchronous rotary machine 400 and detection current i of synchronous rotary machine 400.

Error variable & may also be determined by computing an inner product (first inner product) of estimated magnetic flux $\Psi_{am}$ of synchronous rotary machine 400 and detection current i of synchronous rotary machine 400.

Accordingly, as shown in Equation (10), command amplitude generator 118 may be configured to compute, as error variable E, an inner product (first inner product) of estimated magnetic flux $\Psi_s$ of synchronous rotary machine 400 and detection current i of synchronous rotary machine 400, instead of the second inner product.

[Math. 10]

$$\varepsilon = \Psi_\alpha i_\alpha + \Psi_\beta i_\beta - L_{qm}(i_\alpha^2 + i_\beta^2) \tag{10}$$

As shown in FIG. 4, command amplitude generator 118 includes subtracter 132, P gain 134, I gain 136, integrator 138, adder 140, and adder 142. Command amplitude generator 118 sets the target value of error variable ε, or in other words, target value ε* of the result of computation of the first inner product or the second inner product. Here, command amplitude generator 118 sets target value ε* of the result of computation of the first inner product or the second inner to zero. Adder 142 generates command amplitude $|\Psi_s^*|$ by adding absolute value $|\Delta\Psi|$ of calculated magnetic flux deviation $\Delta\Psi$ and $\Psi_{a\_nominal}$ that is a nominal value of estimated magnetic flux $\Psi_{am}$.

In the manner as described above, command amplitude generator 118 generates command amplitude $|\Psi_s^*|$ by executing feedback control that uses error variable E.

(Magnetization Characteristics Determiner 120)

Figure 5:
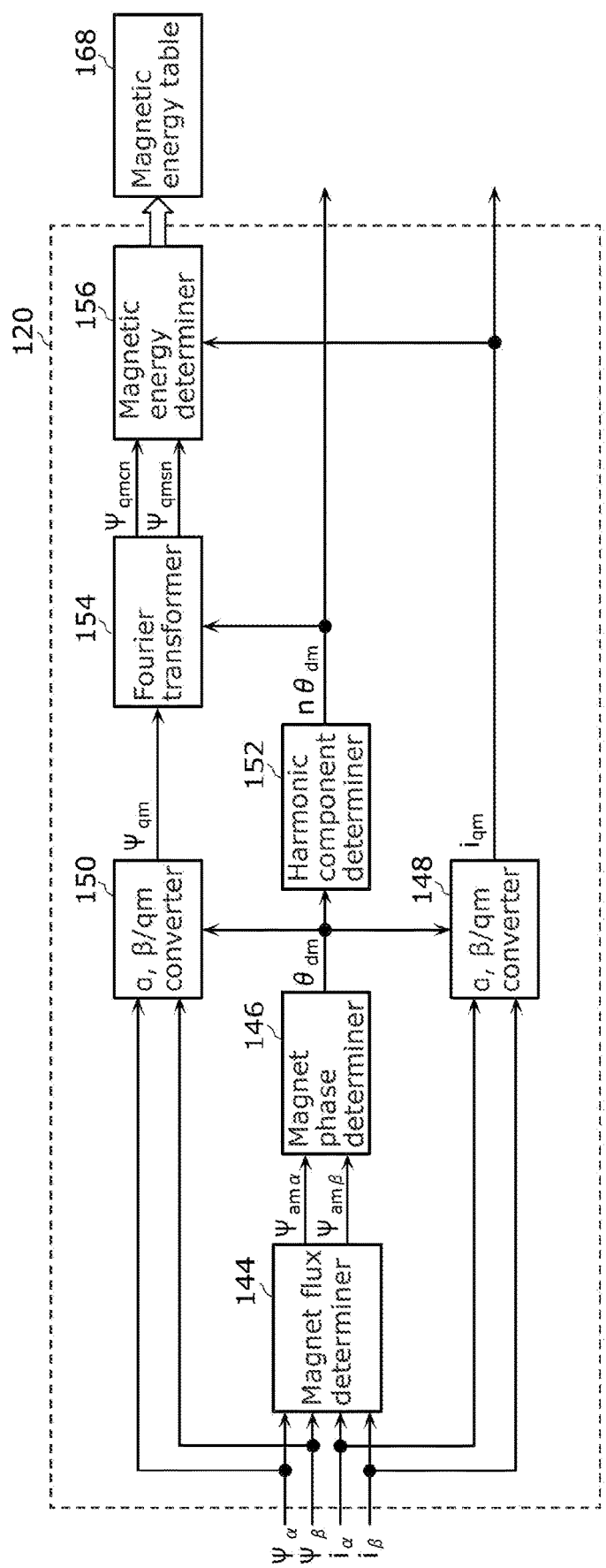
FIG. 5 is a block diagram of a magnetization characteristics determiner included in the position sensorless controller shown in FIG. 3.

As shown in FIG. 5, magnetization characteristics determiner 120 determines magnet phase $\theta_{dm}$ that is the phase of magnet flux $\Psi_{am}$ (see FIG. 2) based on estimated magnetic flux $\Psi_s$ and detection current i, and also determines qm-axis magnetic flux $\Psi_{qm}$ of estimated magnetic flux $\Psi_s$, qm-axis current $i_{qm}$ of detection current i, and harmonic component $n\theta_{dm}$ of magnet phase $\theta_{dm}$ by using a dm-qm coordinate system with the dm-axis representing magnet phase $\theta_{dm}$ and the qm axis representing a phase shifted by 90 degrees from magnet phase $\theta_{dm}$. Qm-axis magnetic flux $\Psi_{qm}$ is the qm-axis component of estimated magnetic flux $\Psi_s$, and qm-axis current $i_{qm}$ is the qm-axis component of detection current i.

Magnetization characteristics determiner 120 includes magnet flux determiner 144, magnet phase determiner 146, α, β/qm converter 148, α, β/qm converter 150, harmonic component determiner 152, fourier transformer 154, and magnetic energy determiner 156.

Magnet flux determiner 144 determines magnet flux $\Psi_{am}$ based on virtual inductance (the inductance of synchronous rotary machine 400) Lam, axis currents $i_\alpha$ and $i_\beta$, and estimated magnetic flux $\Psi_s$ (estimated magnetic fluxes $\Psi_\alpha$ and $\Psi_\beta$). Specifically, magnet flux determiner 144 determines magnet flux $\Psi_{am\alpha}$ by using Equation (11), and determines magnet flux $\Psi_{am\beta}$ by using Equation (12). As shown in FIG. 2, magnet flux $\Psi_{am\alpha}$ is the α-axis component of magnet flux $\Psi_{am}$, and magnet flux $\Psi_{am\beta}$ is the β-axis component of magnet flux $\Psi_{am}$.

[Math. 11]

$$\Psi_{am\alpha} = \Psi_\alpha - L_{qm} i_\alpha \tag{11}$$

[Math. 12]

$$\Psi_{am\beta} = \Psi_\beta - L_{qm} i_\beta \tag{12}$$

Magnet phase determiner 146 determines magnet phase $\theta_{dm}$ from magnet flux $\Psi_{am\alpha}$ and magnet flux $\Psi_{am\beta}$ by using Equation (13).

[Math. 13]

$$\theta_{dm} = \tan^{-1}(\Psi_{am\beta}/\Psi_{am\alpha}) \tag{13}$$

α, β/qm converter 148 converts axis currents $i_\alpha$ and $i_\beta$ to qm-axis current $i_{qm}$. Specifically, α, β/qm converter 148 converts axis currents $i_\alpha$ and $i_\beta$ to qm-axis current $i_{qm}$ by using Equation (14), and outputs qm-axis current $i_{qm}$.

[Math. 14]

$$i_{qm} = -i_\alpha \sin\theta_{dm} + i_\beta \cos\theta_{dm} \tag{14}$$

α, β/qm converter 150 converts estimated magnetic flux $\Psi_s$ (estimated magnetic fluxes $\Psi_\alpha$ and $\Psi_\beta$) to qm-axis magnetic flux $\Psi_{qm}$. Specifically, α, β/qm converter 150 converts estimated magnetic flux $\Psi_s$ (estimated magnetic fluxes W. and $\Psi_\beta$) to qm-axis magnetic flux $\Psi_{qm}$ by using Equation (15), and outputs qm-axis magnetic flux 4qm.

[Math. 15]

$$\Psi_{qm} = -\Psi_\alpha \sin\theta_{qm} + \Psi_\beta \cos\theta_{dm} \tag{15}$$

Harmonic component determiner 152 determines harmonic component $n\theta_{dm}$ of magnet phase $\theta_{dm}$. Specifically, harmonic component determiner 152 determines harmonic component $n\theta_{dm}$ by multiplying magnet phase $\theta_{dm}$ by order n, and outputs harmonic component $n\theta_{dm}$.

Fourier transformer 154 determines magnetic flux $\Psi_{qmcn}$ and magnetic flux $\Psi_{qmsn}$ from qm-axis magnetic flux $\Psi_{qm}$ and harmonic component $n\theta_{dm}$.

Figure 6:
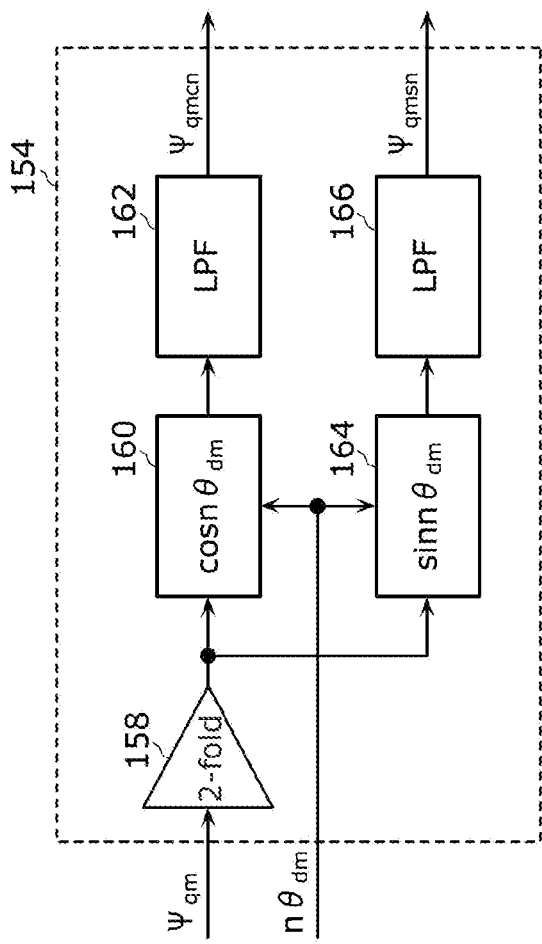
FIG. 6 is a block diagram of a fourier transformer included in the magnetization characteristics determiner shown in FIG. 5.

As shown in FIG. 6, fourier transformer 154 includes amplifier 158, multiplier 160, low-pass filter 162, multiplier 164, and low-pass filter 166.

Amplifier 158 amplifies qm-axis magnetic flux $\Psi_{qm}$ by 2-fold.

Multiplier 160 multiplies qm-axis magnetic flux $\Psi_{qm}$ amplified by 2-fold by $\cos n\theta_{dm}$.

Low-pass filter 162 outputs magnetic flux $\Psi_{qmcn}$ from qm-axis magnetic flux $\Psi_{qm}$ amplified by 2-fold and multiplied by $\cos n\theta_{dm}$.

Multiplier 164 multiplies qm-axis magnetic flux $\Psi_{qm}$ amplified by 2-fold by $\sin n\theta_{dm}$.

Low-pass filter 166 outputs magnetic flux $\Psi_{qmsn}$ from qm-axis magnetic flux $\Psi_{qm}$ amplified by 2-fold and multiplied by $\sin n\theta_{dm}$.

Referring back to FIG. 5, magnetic energy determiner 156 determines magnetic energy $W'_{qmcn}$ from magnetic flux $\Psi_{qmcn}$ by using Equation (16), and determines magnetic energy $W'_{qmsn}$ from magnetic flux $\Psi_{qmsn}$ by using Equation (17).

[Math. 16]

$$W'_{qmcn} = \int_0^{i_{qm}} \Psi_{qmcn}(0, i'_{qm}) di'_{qm} \tag{16}$$

[Math. 17]

$$W'_{qmsn} = \int_0^{i_{qm}} \Psi_{qmsn}(0, i'_{qm}) di'_{qm} \tag{17}$$

Magnetic energy determiner 156 creates magnetic energy table 168 as shown in FIG. 7 by using the obtained results. (a) in FIG. 7 shows a table showing the values of magnetic energy $W'_{qmcn}$ that correspond to the values of qm-axis current $i_{qm}$. (b) in FIG. 7 shows a table showing the values of magnetic energy $W'_{qmsn}$ that correspond to the values of qm-axis current $i_{qm}$.

(Ripple Compensation Determiner 122)

Figure 8:
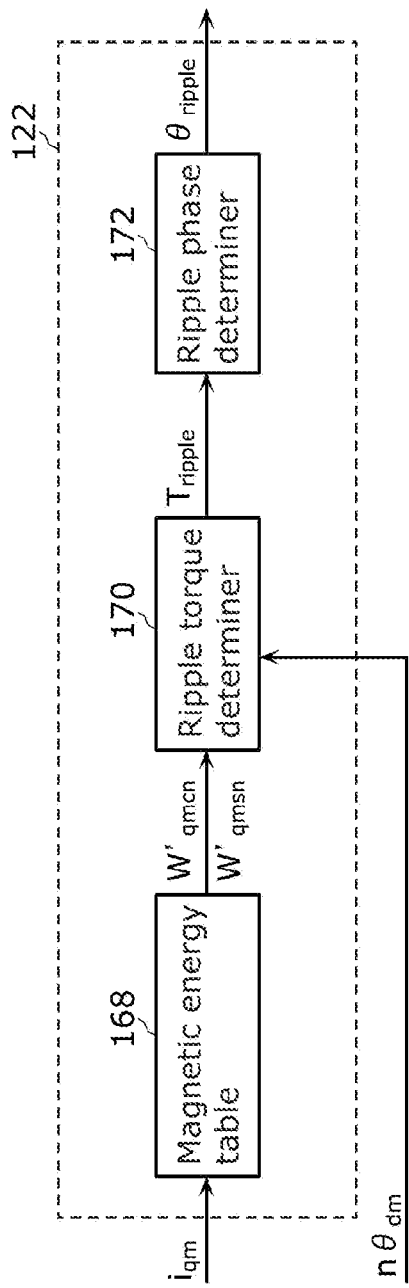
FIG. 8 is a block diagram of a ripple compensation determiner included in the position sensorless controller shown in FIG. 3.

As shown in FIG. 8, ripple compensation determiner 122 determines ripple compensation phase $\theta_{ripple}$ by using ripple compensation torque $T_{ripple}$ obtained based on qm-axis current $i_{qm}$ and harmonic component $n\theta_{dm}$. Ripple compensation determiner 122 includes magnetic energy table 168, ripple torque determiner 170, and ripple phase determiner 172.

Ripple compensation determiner 122 determines magnetic energy $W'_{qmcn}$ and magnetic energy $W'_{qmsn}$ by using qm-axis current $i_{qm}$ output from α, β/qm converter 148 and magnetic energy table 168 created by magnetic energy determiner 156. Specifically, ripple compensation determiner 122 selects, from magnetic energy table 168, a value of magnetic energy $W'_{qmcn}$ that corresponds to the value of qm-axis current $i_{qm}$ output from α, β/qm converter 148, and outputs the selected value. Also, ripple compensation determiner 122 selects, from magnetic energy table 168, a value of magnetic energy $W'_{qmsn}$ that corresponds to the value of qm-axis current $i_{qm}$ output from α, β/qm converter 148, and outputs the selected value.

Figure 9:
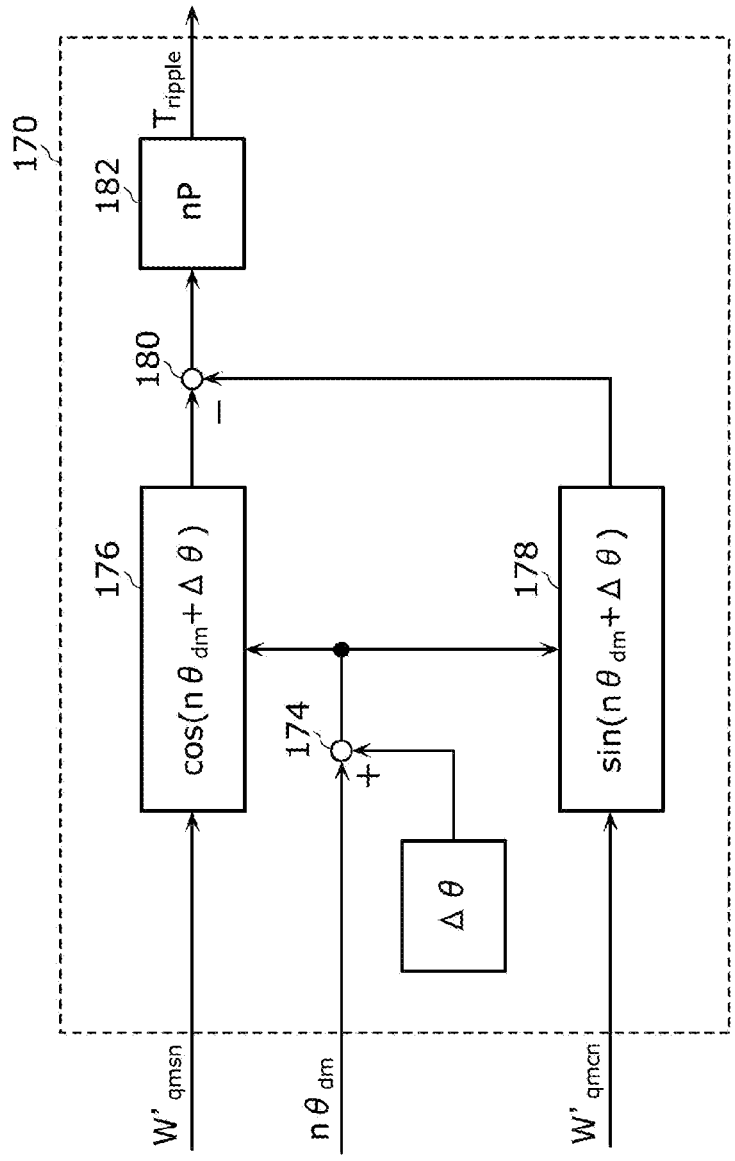
FIG. 9 is a block diagram of a ripple torque determiner included in the ripple compensation determiner shown in FIG. 8.

As shown in FIG. 9, ripple torque determiner 170 includes adder 174, multiplier 176, multiplier 178, subtracter 180, and multiplier 182.

Adder 174 adds harmonic component $n\theta_{dm}$ of magnet phase $\theta_{dm}$ and adjustment phase $\Delta\theta$. For example, adjustment phase $\Delta\theta$ is input from the outside.

Multiplier 176 multiplies $W'_{qmsn}$ by $\cos(n\theta_{dm} + \Delta\theta)$ Multiplier 178 multiplies $W'_{qmcn}$ by $\sin(n\theta_{dm} + \Delta\theta)$.

Subtracter 180 subtracts $W'_{qmcn} \sin(n\theta_{dm} + \Delta\theta)$ from $W'_{qmsn} \cos(n\theta_{dm} + \Delta\theta)$.

Multiplier 182 determines ripple compensation torque $T_{ripple}$ by using Equation (18), where n represents order, and P represents the number of pole pairs of synchronous rotary machine 400.

[Math. 18]

$$T_{ripple} = nP\{W'_{qmsn}\cos(n\theta_{dm}+\Delta\theta) - W'_{qmcn}\sin(n\theta_{dm}+\Delta\theta)\} \quad (18)$$

Figure 10:
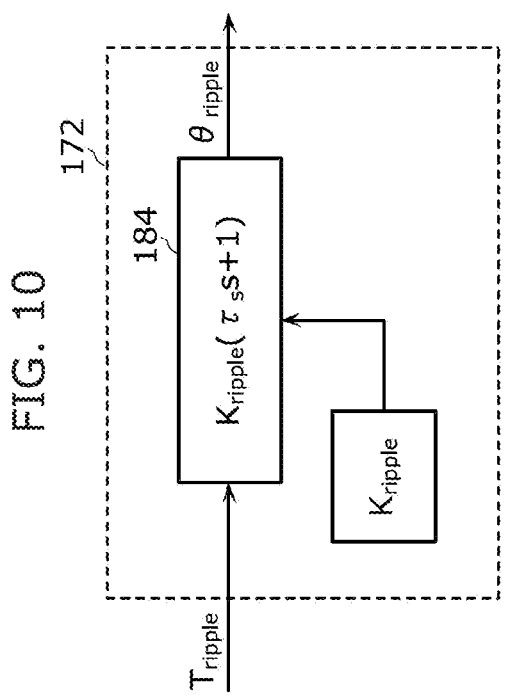
FIG. 10 is a block diagram of a ripple phase determiner included in the ripple compensation determiner shown in FIG. 8.

As shown in FIG. 10, ripple phase determiner 172 includes multiplier 184.

Multiplier 184 determines ripple compensation phase $\theta_{ripple}$ by using ripple compensation torque $T_{ripple}$ and adjustment gain $K_{ripple}$ based on Equation (19). Adjustment gain $K_{ripple}$ is a known constant. Also, $\tau_s$ represents a motor time constant, and $\tau_s s$ represents a differential operator.

[Math. 19]

$$\theta_{ripple} = T_{ripple} K_{ripple}(\tau_s s + 1) \quad (19)$$

(Command Phase Determiner 124)

Referring back to FIG. 3, command phase determiner 124 determines the command magnetic flux vector phase based on ripple compensation phase $\theta_{ripple}$ and a torque command or a rotation speed command. Here, an example will be described in which the command magnetic flux vector phase is determined based on the torque command. The command magnetic flux vector phase is command phase $\theta_s^*$. That is, in the present embodiment, as shown in FIG. 2, command phase $\theta_s^*$ is the phase of command magnetic flux vector $\Psi_s^*$. In the present embodiment, command phase determiner 124 determines command phase $\theta_s^*$ by adding torque phase $\Delta\theta_s$ for converging estimated torque $T_e$ on command torque $T_e^*$, ripple compensation phase $\theta_{ripple}$, and estimated phase $\theta_s$. That is, command phase determiner 124 determines command phase $\theta_s^*$ by using torque phase $\Delta\theta_s$, ripple compensation phase $\theta_{ripple}$, and estimated phase $\theta_s$.

Figure 11:
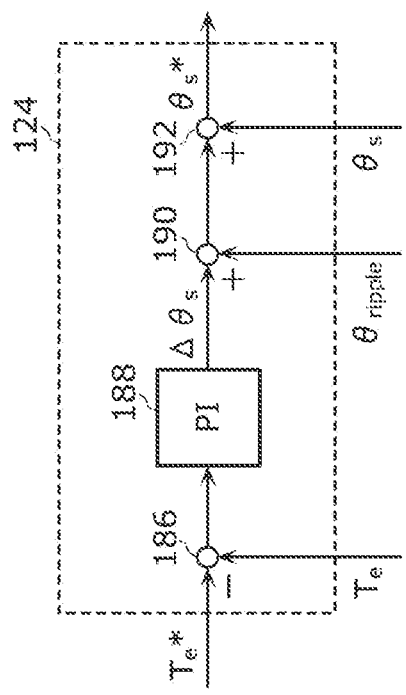
FIG. 11 is a block diagram of a command phase determiner included in the position sensorless controller shown in FIG. 3.

As shown in FIG. 11, command phase determiner 124 includes subtracter 186, PI compensator 188, adder 190, and adder 192.

Subtracter 186 determines a deviation by subtracting estimated torque $T_e$ from command torque $T_e^*$.

PI compensator 188 determines torque phase $\Delta\theta_s$ by performing proportional-integral control for converging the deviation determined by subtracter 186 on 0.

Adder 190 adds torque phase $\Delta\theta_s$ and ripple compensation phase $\theta_{ripple}$.

Adder 192 determines command phase $\theta_s^*$ by further adding estimated phase $\theta_s$ to torque phase $\Delta\theta_s$ and ripple compensation phase $\theta_{ripple}$.

(Command Magnetic Flux Generator 126)

Referring back to FIG. 3, command magnetic flux generator 126 generates command magnetic fluxes $\Psi_\alpha^*$ and $\Psi_\beta^*$ based on command amplitude $|\Psi_s^*|$ and command phase $\theta_s^*$. In the present embodiment, command magnetic flux generator 126 determines command magnetic flux vector $\Psi_s^*$ (command magnetic fluxes $\Psi_\alpha^*$ and $\Psi_\beta^*$) based on command amplitude $|\Psi_s^*|$ and command phase $\theta_s^*$. In the present embodiment, command magnetic flux generator 126 determines command magnetic flux vector $\Psi_s^*$ (command magnetic fluxes $\Psi_\alpha^*$ and $\Psi_\beta^*$) from command amplitude $|\Psi_s^*|$ and command phase $\theta_s^*$. Specifically, command magnetic flux generator 126 determines command magnetic fluxes $\Psi_\alpha^*$ and $\Psi_\beta^*$ by using Equations (20) and (21).

[Math. 20]

$$\Psi_\alpha^* = |\Psi_s^*|\cos\theta_s^* \quad (20)$$

[Math. 21]

$$\Psi_\beta^* = |\Psi_s^*|\sin\theta_s^* \quad (21)$$

(Voltage Command Generator 128)

Voltage command generator 128 determines command axis voltages $v_\alpha^*$ and $v_\alpha^*$ by using estimated magnetic flux $\Psi_s$ (estimated magnetic fluxes $\Psi_\alpha$ and $\Psi_\beta$), axis currents $i_\alpha$ and $i_\beta$, and command magnetic flux vector $\Psi_s^*$ (command magnetic fluxes $\Psi_\alpha^*$ and $\Psi_\beta^*$). First, voltage command generator 128 subtracts estimated magnetic flux $\Psi_\alpha$ from command magnetic flux $\Psi_\alpha^*$ to determine a deviation between estimated magnetic flux $\Psi_\alpha$ and command magnetic flux $\Psi_\alpha^*$ (magnetic flux deviation $\Delta\Psi_\alpha$: $\Psi_\alpha^* - \Psi_\alpha$). Also, voltage command generator 128 subtracts estimated magnetic flux Up from command magnetic flux $\Psi_\beta^*$ to determine a deviation between estimated magnetic flux $\Psi_\beta$ and command magnetic flux $\Psi_\beta^*$ (magnetic flux deviation $\Delta\Psi_\beta$: $\Psi_\beta^* - \Psi_\beta$). Then, voltage command generator 128 determines command axis voltages $v_\alpha^*$ and $v_\beta^*$ by using magnetic flux deviations $\Delta\Psi_\alpha$ and $\Delta\Psi_\beta$ and axis currents $i_\alpha$ and $i_\beta$. Specifically, voltage command generator 128 determines $\alpha$-axis command axis voltage $v_\alpha^*$ by using magnetic flux deviation $\Delta\Psi_\alpha$ and axis current $i_\alpha$ based on Equation (22). Also, voltage command generator 128 determines $\beta$-axis command axis voltage $v_\beta^*$ by using magnetic flux deviation $\Delta\Psi_\beta$ and axis current is based on Equation (23). Here, $T_s$ represents a control cycle.

[Math. 22]

$$v_\alpha^* = \frac{\Delta\Psi_\alpha}{T_s} + Ri_\alpha \quad (22)$$

[Math. 23]

$$v_\beta^* = \frac{\Delta\Psi_\beta}{T_s} + Ri_\beta \quad (23)$$

($\alpha$, $\beta$/u, v, w Converter 130)

$\alpha$, $\beta$/u, v, w converter 130 converts command axis voltages $v_\alpha^*$ and $v_\beta^*$ to command voltage vectors $v_u^*$, $v_v^*$, and $v_w^*$. Specifically, $\alpha$, $\beta$/u, v, w converter 130 converts command axis voltages $v_\alpha^*$ and $v_\beta^*$ to command voltage vectors $v_u^*$, $v_v^*$, and $v_w^*$ by using Equation (24), and outputs command voltage vectors $v_u^*$, $v_v^*$, and $v_w^*$.

[Math. 24]

$$\begin{bmatrix} v_u^* \\ v_v^* \\ v_w^* \end{bmatrix} = \begin{bmatrix} \sqrt{\frac{2}{3}} & 0 \\ -\sqrt{\frac{1}{6}} & \sqrt{\frac{1}{2}} \\ -\sqrt{\frac{1}{6}} & -\sqrt{\frac{1}{2}} \end{bmatrix} \begin{bmatrix} v_\alpha^* \\ v_\beta^* \end{bmatrix} \quad (24)$$

Referring back to FIG. 1, the remaining structural elements of rotary machine control device 100 and structural elements that are connected to rotary machine control device 100 will be described below.

(First Current Sensor 102 and Second Current Sensor 104)

As first current sensor 102 and second current sensor 104, known sensors can be used. In the present embodiment, first current sensor 102 is provided to measure phase current $i_u$ that flows through a u phase. Second current sensor 104 is provided to measure phase current $i_w$ that flows through a w phase. However, first current sensor 102 and second current sensor 104 may be provided to measure electric currents of two phases other than the combination of the u phase and the w phase.

(Duty Generator 108)

Duty generator 108 generates duties $D_u$, $D_v$, and $D_w$ from command voltage vectors $v_u^*$, $v_v^*$, and $v_w^*$. In the present embodiment, duty generator 108 converts the components of command voltage vectors $v_u^*$, $v_v^*$, and $v_w^*$ to duties $D_u$, $D_v$, and $D_w$ of three phases. As the method for generating duties $D_u$, $D_v$, and $D_w$, an ordinary method that is used for a voltage PWM inverter may be used. For example, duties $D_u$, $D_v$, and $D_w$ may be determined by dividing command voltage vectors $v_u^*$, $v_v^*$, and $v_w^*$ by a half value of voltage value $V_{dc}$ of a DC power supply of PWM inverter 300, which will be described later. In this case, duty $D_u$ is $2 \times v_u^*/V_{dc}$. Duty $D_v$ is $2 \times v_v^*/V_{dc}$. Duty $D_w$ is $2 \times v_w^*/V_{dc}$. Duty generator 108 outputs duties $D_u$, $D_v$, and $D_w$.

(PWM Inverter 300)

PWM inverter 300 includes a DC power supply and a conversion circuit. The conversion circuit converts DC voltage to voltage vectors $v_u$, $v_v$, and $v_w$ through PWM control. PWM inverter 300 applies voltage vectors $v_u$, $v_v$, and $v_w$ obtained as a result of the conversion to synchronous rotary machine 400.

(Synchronous Rotary Machine 400)

Synchronous rotary machine 400 is a target to be controlled by rotary machine control device 100. The voltage vectors are applied to synchronous rotary machine 400 by PWM inverter 300. As used herein, the expression "the voltage vectors are applied to synchronous rotary machine 400" means that voltage is applied to each of three phases (a U phase, a V phase, and a W phase) on a three-phase AC coordinate system that is applied to synchronous rotary machine 400. In the present embodiment, synchronous rotary machine 400 is controlled such that each of the three phases (a U phase, a V phase, and a W phase) is selected from the following two types: a high-voltage phase that has a relatively high voltage; and a low-voltage phase that has a relatively low voltage.

Synchronous rotary machine 400 is, for example, a permanent magnetic synchronous motor. Examples of the permanent magnetic synchronous motor include an interior permanent magnet synchronous motor (IPMSM) and a surface permanent magnet synchronous motor (SPMSM). The IPMSM has saliency in which d-axis inductance Ld and q-axis inductance Lq are different (generally, inverse saliency of Lq>Ld), and reluctance torque may also be used in addition to magnet torque. For this reason, the IPMSM has an extremely high driving efficiency. As synchronous rotary machine 400, it is also possible to use a synchronous reluctance motor.

Advantageous Effects, etc.

Rotary machine control device 100 according to Embodiment 1 includes: magnetic flux estimator 112 that estimates a rotary machine magnetic flux that is a magnetic flux of synchronous rotary machine 400; command amplitude generator 118 that generates command amplitude $|\Psi_s^*|$ that is an amplitude of command magnetic fluxes $\Psi_\alpha^*$ and $\Psi_\beta^*$ by executing feedback control that uses a first inner product or a second inner product, the first inner product being a product of estimated magnetic flux $\Psi_s$ that is an estimated rotary machine magnetic flux and detection current i of synchronous rotary machine 400, the second inner product being a product of detection current i and estimated magnet flux $\Psi_{am}$ of a permanent magnet included in synchronous rotary machine 400; magnetization characteristics determiner 120 that determines magnet phase $\theta_{dm}$ that is a phase of magnet flux $\Psi_{am}$ based on estimated magnetic flux $\Psi_s$ and detection current i, and also determines qm-axis magnetic flux $\Psi_{qm}$ of estimated magnetic flux $\Psi_s$, qm-axis current $i_{qm}$ of detection current i, and harmonic component $n\theta_{dm}$ of magnet phase $\theta_{dm}$ by using a dm-qm coordinate system with the dm axis representing magnet phase $\theta_{dm}$ and the qm axis representing a phase shifted by 90 degrees from magnet phase $\theta_{dm}$; ripple compensation determiner 122 that determines ripple compensation phase $\theta_{ripple}$ by using ripple compensation torque $T_{ripple}$ obtained based on qm-axis current $i_{qm}$ and harmonic component $n\theta_{dm}$; command phase determiner 124 that determines command phase $\theta_s^*$ based on ripple compensation phase $\theta_{ripple}$ and a torque command or a rotation speed command; and command magnetic flux generator 126 that generates command magnetic fluxes $\Psi_\alpha^*$ and $\Psi_\beta^*$ based on command amplitude $|\Psi_s^*|$ and command phase $\theta_s^*$.

With this configuration, it is possible to: determine magnet phase $\theta_{dm}$; determine qm-axis magnetic flux $\Psi_{qm}$ of estimated magnetic flux $\Psi_s$, qm-axis current $i_{qm}$ of detection current i, and harmonic component $n\theta_{dm}$ of magnet phase $\theta_{dm}$ by using a dm-qm coordinate system with the dm axis representing magnet phase $\theta_{dm}$ and the qm axis representing a phase shifted by 90 degrees from magnet phase $\theta_{dm}$; determine ripple compensation phase $\theta_{ripple}$ by using ripple compensation torque $T_{ripple}$ obtained based on qm-axis current $i_{qm}$ and harmonic component $n\theta_{dm}$; and determine command phase $\theta_s^*$ based on ripple compensation phase $\theta_{ripple}$ and a torque command or a rotation speed command. Accordingly, in the position sensorless magnetic flux control, the torque ripple can be effectively reduced.

Also, rotary machine control device 100 according to Embodiment 1 further includes: phase determiner 114 that determines estimated phase $\theta_s$ that is a phase of estimated magnetic flux $\Psi_s$ based on estimated magnetic flux $\Psi_s$; and torque estimator 116 that computes estimated torque $T_e$ based on estimated magnetic flux $\Psi_s$ and detection current i. Command phase determiner 124 determines command phase $\theta_s^*$ by adding torque phase $\Delta\theta_s$ for converging estimated torque $T_e$ on command torque $T_e^*$, ripple compensation phase $\theta_{ripple}$, and estimated phase $\theta_s$.

With this configuration, command phase $\theta_s^*$ can be determined by adding torque phase $\Delta\theta_s$ for converging estimated torque $T_e$ on command torque $T_e^*$, ripple compensation phase $\theta_{ripple}$, and estimated phase $\theta_s$. Accordingly, in the position sensorless magnetic flux control, the torque ripple can be more effectively reduced.

Also, in rotary machine control device 100 according to Embodiment 1, command amplitude generator 118 sets a target value of a result of computation of the first inner product or the second inner product to zero.

With this configuration, it is possible to cause electric current that generates a field magnetic flux in the direction of magnet flux $\Psi_{am}$ of the permanent magnet of synchronous rotary machine 400 to flow. Accordingly, the torque ripple can be more effectively reduced.

Embodiment 2

Hereinafter, a rotary machine control device according to Embodiment 2 that is configured by changing a portion of rotary machine control device 100 according to Embodiment 1 will be described. Here, in the rotary machine control device according to Embodiment 2, structural elements that are the same as those of rotary machine control device 100 are given the same reference numerals, and a detailed description thereof will be omitted because they have already been described above. Accordingly, the following description will be given focusing on a difference from rotary machine control device 100.

Figure 12:
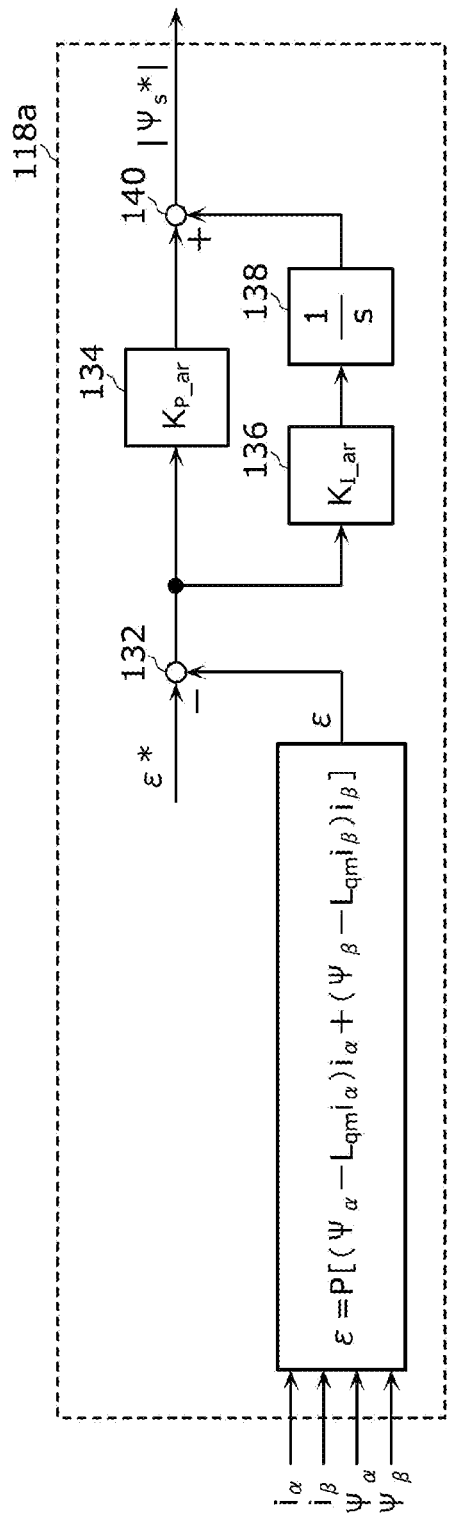
FIG. 12 is a block diagram of a command amplitude generator included in a rotary machine control device according to Embodiment 2.

FIG. 12 is a block diagram of command amplitude generator 118a included in the rotary machine control device according to Embodiment 2.

As shown in FIG. 12, the rotary machine control device according to Embodiment 2 is configured by replacing command amplitude generator 118 of rotary machine control device 100 according to Embodiment 1 with command amplitude generator 118a.

Command amplitude generator 118a is different from command amplitude generator 118 mainly in that command amplitude generator 118a does not include adder 142. Command amplitude generator 118a outputs the value determined by adder 140 as command amplitude $|\Psi_s^*|$.

As described above, command amplitude generator 118a does not necessarily need to include adder 142.

Embodiment 3

Hereinafter, a rotary machine control device according to Embodiment 3 that is configured by changing a portion of rotary machine control device 100 according to Embodiment 1 will be described. Here, in the rotary machine control device according to Embodiment 3, structural elements that are the same as those of rotary machine control device 100 are given the same reference numerals, and a detailed description thereof will be omitted because they have already been described above. Accordingly, the following description will be given focusing on differences from rotary machine control device 100.

Figure 13:
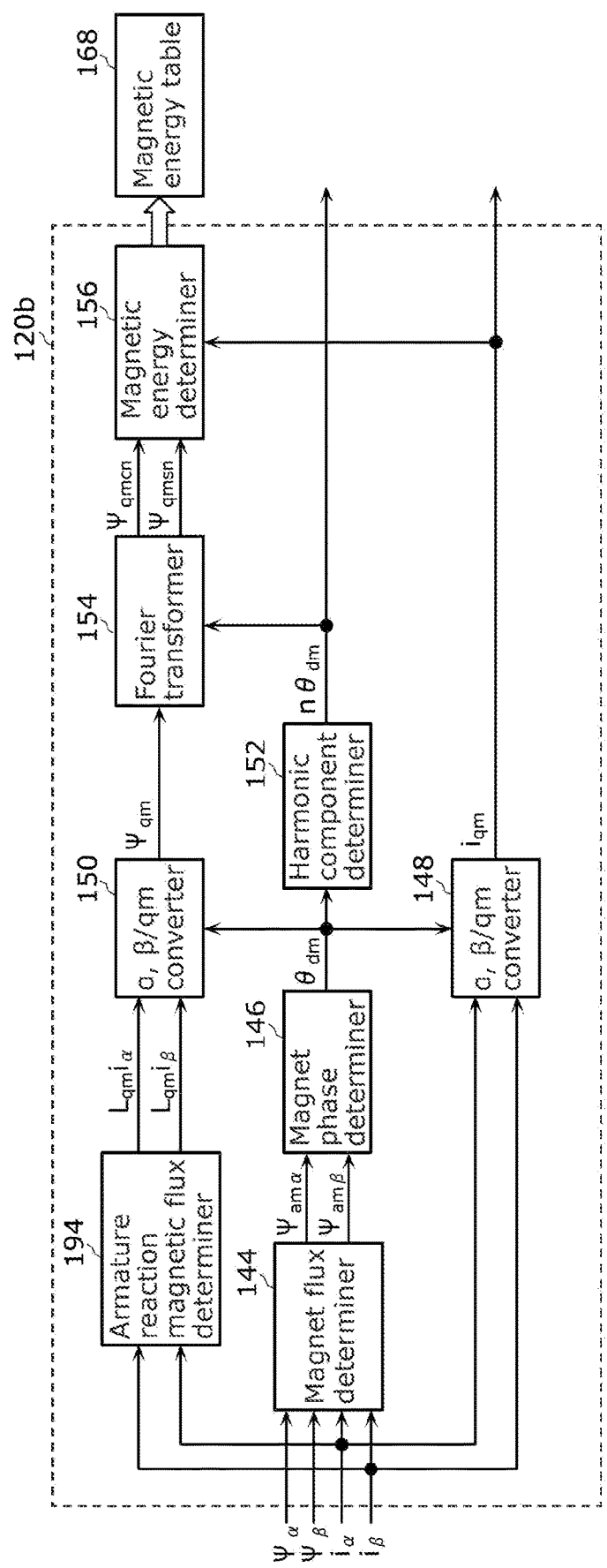
FIG. 13 is a block diagram of a magnetization characteristics determiner included in a rotary machine control device according to Embodiment 3.
Figure 14:
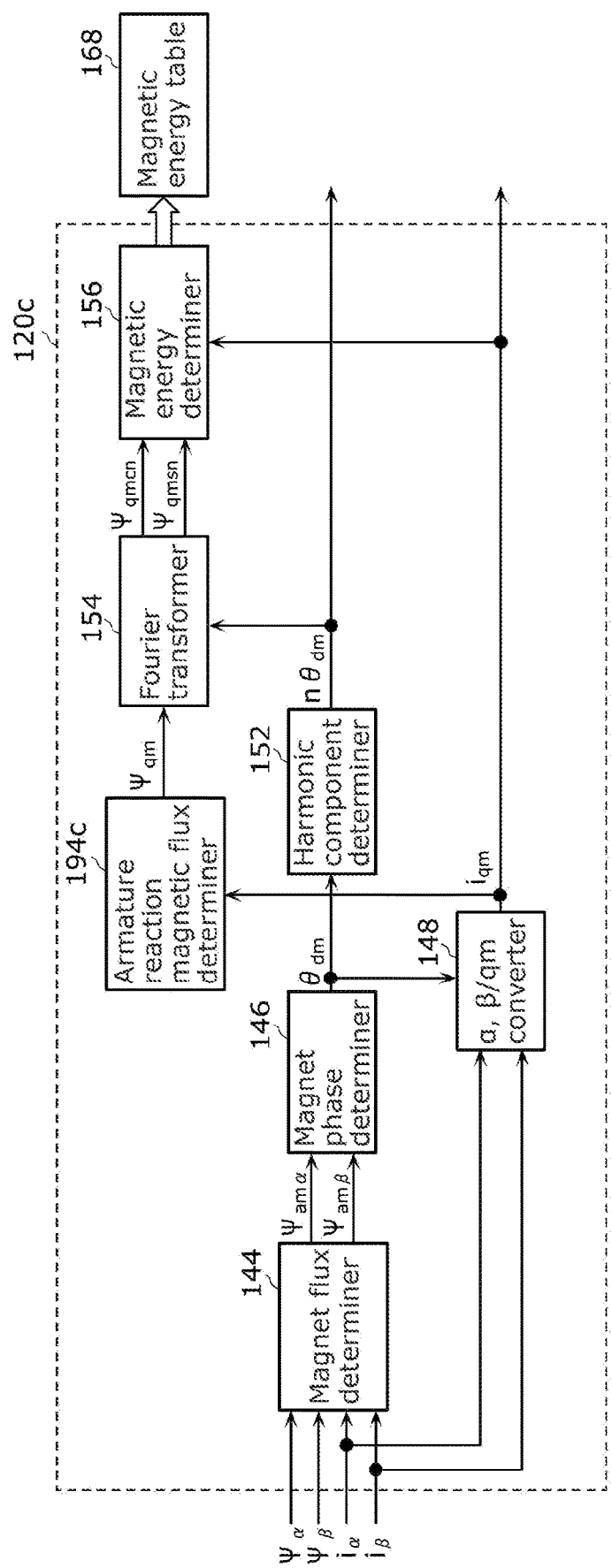
FIG. 14 is a block diagram of another magnetization characteristics determiner included in the rotary machine control device according to Embodiment 3.

FIG. 13 is a block diagram of magnetization characteristics determiner 120b included in the rotary machine control device according to Embodiment 3. FIG. 14 is a block diagram of magnetization characteristics determiner 120c that is another magnetization characteristics determiner included in the rotary machine control device according to Embodiment 3.

As shown in FIG. 13, the rotary machine control device according to Embodiment 3 is configured by replacing magnetization characteristics determiner 120 of rotary machine control device 100 according to Embodiment 1 with magnetization characteristics determiner 120b.

Magnetization characteristics determiner 120b is different from magnetization characteristics determiner 120 mainly in that magnetization characteristics determiner 120b further includes armature reaction magnetic flux determiner 194.

Armature reaction magnetic flux determiner 194 multiplies axis current $i_\alpha$ by virtual inductance Lam to determine estimated armature reaction magnetic flux $L_{qm}i_\alpha$ and outputs estimated armature reaction magnetic flux $L_{qm}i_\alpha$, and also multiplies axis current is by virtual inductance $L_{qm}$ to determine estimated armature reaction magnetic flux $L_{qm}i_\beta$ and outputs estimated armature reaction magnetic flux $L_{qm}i_\beta$.

α, β/qm converter 150 converts estimated armature reaction magnetic fluxes $L_{qm}i_\alpha$ and $L_{qm}i_\beta$ to qm-axis magnetic flux $\Psi_{qm}$. Specifically, α, β/qm converter 150 converts estimated armature reaction magnetic fluxes $L_{qm}i_\alpha$ and $L_{qm}i_\beta$ to qm-axis magnetic flux $\Psi_{qm}$ by using Equation (25), and outputs qm-axis magnetic flux $\Psi_{qm}$.

[Math. 25]

$$\Psi_{qm} = -(L_{qm}i_\alpha)\sin\theta_{dm} + (L_{qm}i_\beta)\cos\theta_{dm} \qquad (25)$$

As described above, magnetization characteristics determiner 120b may further include armature reaction magnetic flux determiner 194.

Magnetization characteristics determiner 120b shown in FIG. 13 may be replaced with magnetization characteristics determiner 120c shown in FIG. 14.

As shown in FIG. 14, magnetization characteristics determiner 120c is different from magnetization characteristics determiner 120b mainly in that magnetization characteristics determiner 120c includes armature reaction magnetic flux determiner 194c, instead of armature reaction magnetic flux determiner 194. That is, armature reaction magnetic flux determiner 194c is provided downstream of α, β/qm converter 148. Armature reaction magnetic flux determiner 194c multiplies qm-axis current qm output from α, β/qm converter 148 by virtual inductance $L_{qm}$, and outputs qm-axis magnetic flux $\Psi_{qm}$. Accordingly, with magnetization characteristics determiner 120c, it is unnecessary to provide α, β/qm converter 150, and thus magnetization characteristics determiner 120c can have a simpler configuration than magnetization characteristics determiner 120b.

As described above, magnetization characteristics determiner 120b may be replaced with magnetization characteristics determiner 120c that includes armature reaction magnetic flux determiner 194c.

Embodiment 4

Hereinafter, a rotary machine control device according to Embodiment 4 that is configured by changing a portion of rotary machine control device 100 according to Embodiment 1 will be described. Here, in the rotary machine control device according to Embodiment 4, structural elements that are the same as those of rotary machine control device 100 are given the same reference numerals, and a detailed description thereof will be omitted because they have already been described above. Accordingly, the following description will be given focusing on differences from rotary machine control device 100.

Figure 15:
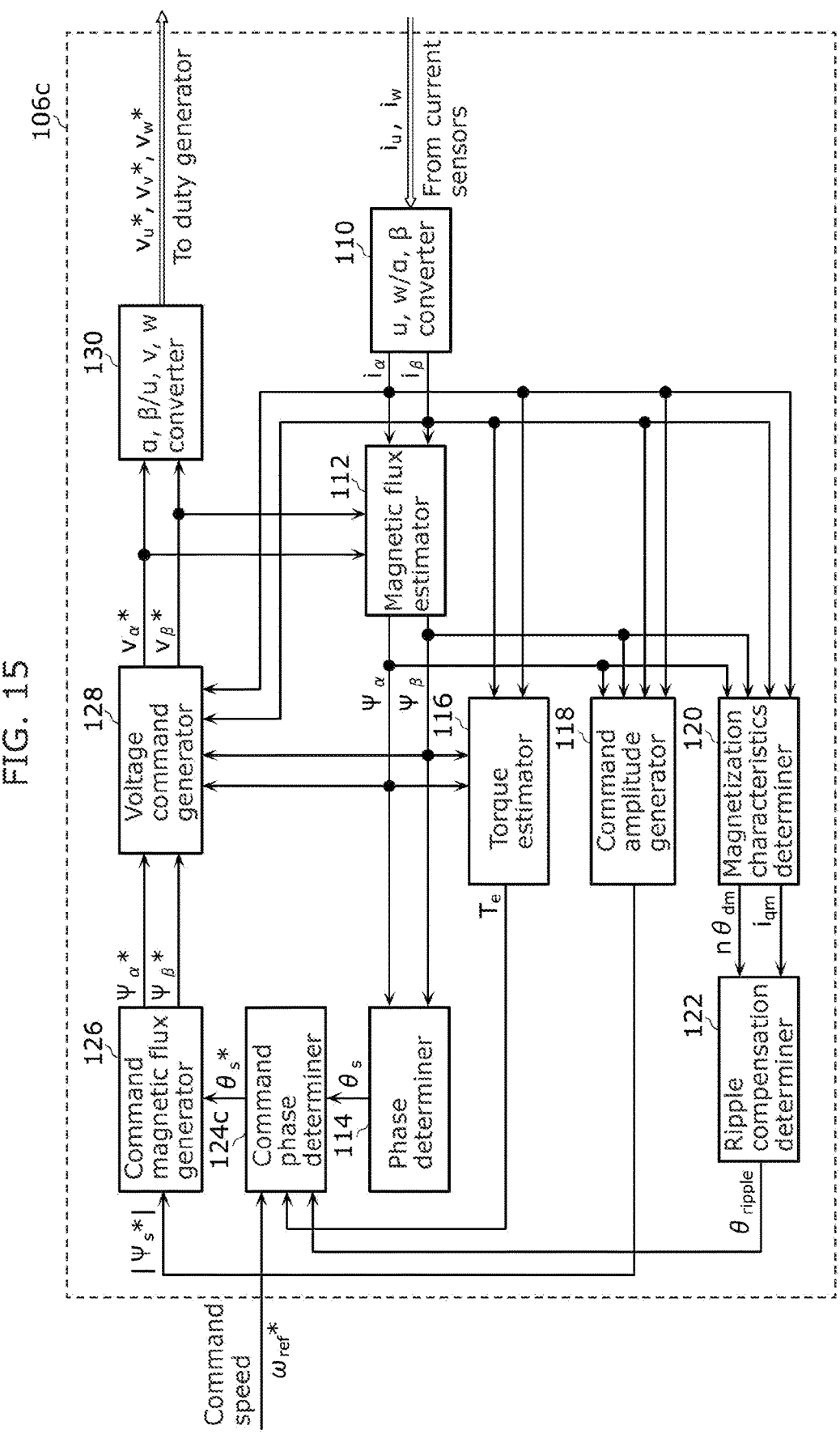
FIG. 15 is a block diagram of a position sensorless controller included in a rotary machine control device according to Embodiment 4.
Figure 16:
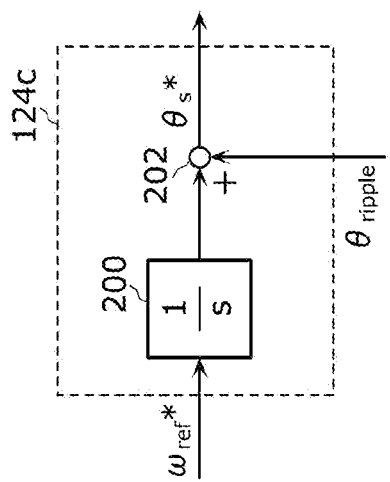
FIG. 16 is a block diagram of a command phase determiner included in the position sensorless controller shown in FIG. 15.

FIG. 15 is a block diagram of position sensorless controller 106c included in the rotary machine control device according to Embodiment 4. FIG. 16 is a block diagram of command phase determiner 124c included in position sensorless controller 106c shown in FIG. 15.

As shown in FIG. 15, the rotary machine control device according to Embodiment 4 is configured by replacing position sensorless controller 106 of rotary machine control device 100 according to Embodiment 1 with position sensorless controller 106c.

Position sensorless controller 106c is different from position sensorless controller 106 mainly in that position sensorless controller 106c includes command phase determiner 124c, instead of command phase determiner 124.

In the present embodiment, command speed $\omega_{ref}^*$ is input to position sensorless controller 106c. Command speed $\omega_{ref}^*$ represents a speed to be followed by synchronous rotary machine 400. Position sensorless controller 106c generates command voltage vectors $v_u^*$, $v_v^*$, and $v_w^*$ from command speed $\omega_{ref}^*$ and phase currents $i_u$ and $i_w$. By performing control as described above, synchronous rotary machine 400 is controlled such that the speed of synchronous rotary machine 400 follows command speed $\omega_{ref}^*$.

As shown in FIG. 16, command phase determiner 124c includes integrator 200 and adder 202. Command phase determiner 124c determines command phase $\theta_s^*$ based on ripple compensation phase $\theta_{ripple}$ and a rotation speed command.

Integrator 200 integrates command speed $\omega_{ref}^*$.

Adder 202 adds ripple compensation phase $\theta_{ripple}$ to the value determined by integrator 200 to determine command phase $\theta_s^*$.

As described above, the rotary machine control device may include position sensorless controller 106c instead of position sensorless controller 106.

Embodiment 5

Hereinafter, a rotary machine control device according to Embodiment 5 that is configured by changing a portion of the rotary machine control device according to Embodiment 4 will be described. Here, in the rotary machine control device according to Embodiment 5, structural elements that are the same as those of the rotary machine control device according to Embodiment 4 are given the same reference numerals, and a detailed description thereof will be omitted because they have already been described above. Accordingly, the following description will be given focusing on a difference from the rotary machine control device according to Embodiment 4.

Figure 17:
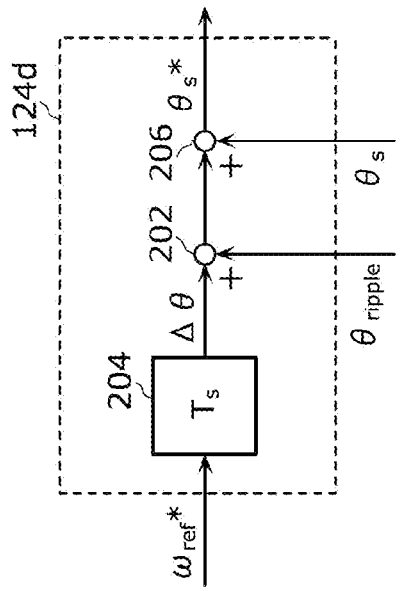
FIG. 17 is a block diagram of a command phase determiner included in a rotary machine control device according to Embodiment 5.

FIG. 17 is a block diagram of command phase determiner 124d included in the rotary machine control device according to Embodiment 5.

As shown in FIG. 17, the rotary machine control device according to Embodiment 5 is configured by replacing command phase determiner 124c of the rotary machine control device according to Embodiment 4 with command phase determiner 124d.

Command phase determiner 124d: (i) determines movement amount $\Delta\theta$ of estimated phase $\theta_s$ of estimated magnetic flux $\Psi_s$ for each control cycle by which estimated phase $\theta_s$ needs to move by using a rotation speed command input to synchronous rotary machine 400; and (ii) determines command phase $\theta_s^*$ by using determined movement amount $\Delta\theta$ and ripple compensation phase $\theta_{ripple}$. Command phase determiner 124d includes adder 202, multiplier 204, and adder 206.

Multiplier 204 multiplies command speed $\omega_{ref}^*$ by $T_s$ to determine movement amount $\Delta\theta$. Here, $T_s$ represents a control cycle.

Adder 202 adds ripple compensation phase $\theta_{ripple}$ to movement amount $\Delta\Theta$.

Adder 206 adds estimated phase $\theta_s$ to the value determined by adder 202 to determine command phase $\theta_s^*$.

As described above, command phase determiner 124d may include adder 202, multiplier 204, and adder 206.

The rotary machine control device according to Embodiment 5 further include phase determiner 114 that determines estimated phase $\theta_s$ that is the phase of estimated magnetic flux $\Psi_s$ based on estimated magnetic flux $\Psi_s$. Command phase determiner 124d: (i) determines movement amount $\Delta\theta$ of estimated phase $\Psi_s$ for each control cycle by which estimated phase $\Psi_s$ needs to move by using a rotation speed command input to synchronous rotary machine 400; and (ii) determines command phase $\theta_s^*$ by using determined movement amount $\Delta\theta$, ripple compensation phase $\theta_{ripple}$, and estimated phase $\theta_s$.

With this configuration, command phase $\theta_s^*$ can be determined by using movement amount $\Delta\theta$ of estimated phase $\Psi_s$ for each control cycle by which estimated phase $\Psi_s$ needs to move, ripple compensation phase $\theta_{ripple}$, and estimated phase $\theta_s$. Accordingly, in the position sensorless magnetic flux control, the torque ripple can be more effectively reduced.

Embodiment 6

Hereinafter, a rotary machine control device according to Embodiment 6 that is configured by changing a portion of the rotary machine control device according to Embodiment 5 will be described. Here, in the rotary machine control device according to Embodiment 6, structural elements that are the same as those of the rotary machine control device according to Embodiment 5 are given the same reference numerals, and a detailed description thereof will be omitted because they have already been described above. Accordingly, the following description will be given focusing on a difference from the rotary machine control device according to Embodiment 5.

Figure 18:
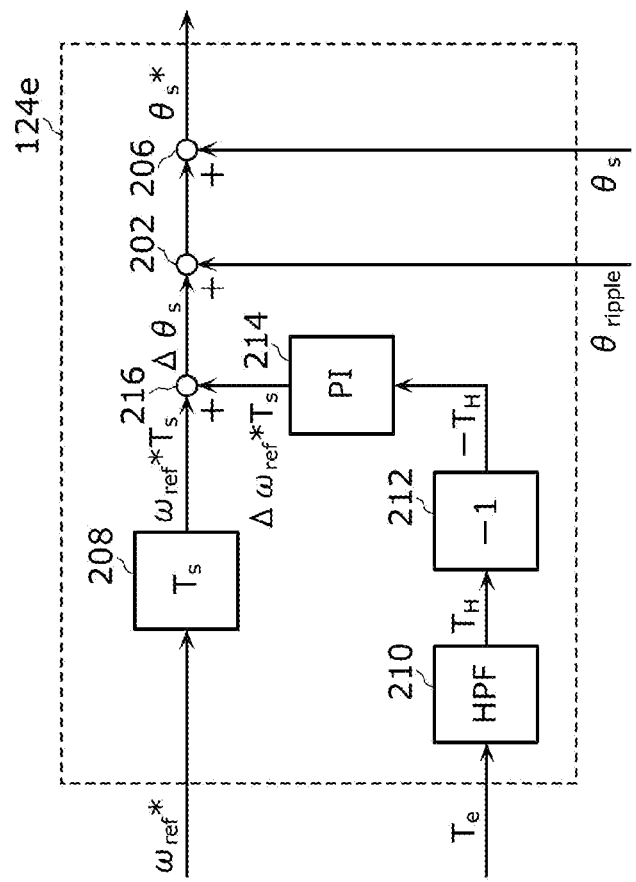
FIG. 18 is a block diagram of a command phase determiner included in a rotary machine control device according to Embodiment 6.

FIG. 18 is a block diagram of command phase determiner 124e included in the rotary machine control device according to Embodiment 6.

As shown in FIG. 18, the rotary machine control device according to Embodiment 6 is configured by replacing command phase determiner 124d of the rotary machine control device according to Embodiment 5 with command phase determiner 124e.

Command phase determiner 124e determines command phase $\theta_s^*$ by further using estimated torque $T_e$. Command phase determiner 124e includes adder 202, adder 206, multiplier 208, high-pass filter 210, sign inverter 212, PI compensator 214, and adder 216.

Multiplier 208 multiplies command speed $\omega_{ref}^*$ by $T_s$ to determine $\omega_{ref}^* T_s$.

High-pass filter 210 outputs torque $T_H$ from estimated torque $T_e$.

Sign inverter 212 inverts the sign of torque $T_H$.

PI compensator 214 determines $\Delta\omega_{ref}^* T_s$ from torque $-T_H$.

Adder 216 adds $\omega_{ref} T_s$ determined by multiplier 208 and $\Delta\omega_{ref}^* T_s$ determined by PI compensator 214 to determine torque phase $\Delta\theta_s$.

Adder 202 adds ripple compensation phase $\theta_{ripple}$ to torque phase $\Delta\theta_s$.

Adder 206 adds estimated phase $\theta_s$ to the value determined by adder 202 to determine command phase $\theta_s^*$.

As described above, command phase determiner 124e may include adder 202, adder 206, multiplier 208, high-pass filter 210, sign inverter 212, PI compensator 214, and adder 216.

The rotary machine control device according to Embodiment 6 may further include torque estimator 116 that computes estimated torque $T_e$ based on estimated magnetic flux $\Psi_s$ and detection current i. Command phase determiner 124e determines command phase $\theta_s^*$ by further using estimated torque $T_e$.

With this configuration, command phase $\theta_s^*$ can be determined by further using estimated torque $T_e$. Accordingly, in the position sensorless magnetic flux control, the torque ripple can be more effectively reduced.

Embodiment 7

Hereinafter, a rotary machine control device according to Embodiment 7 that is configured by changing a portion of the rotary machine control device according to Embodiment 4 will be described. Here, in the rotary machine control device according to Embodiment 7, structural elements that are the same as those of the rotary machine control device according to Embodiment 4 are given the same reference numerals, and a detailed description thereof will be omitted because they have already been described above. Accordingly, the following description will be given focusing on a difference from the rotary machine control device according to Embodiment 4.

Figure 19:
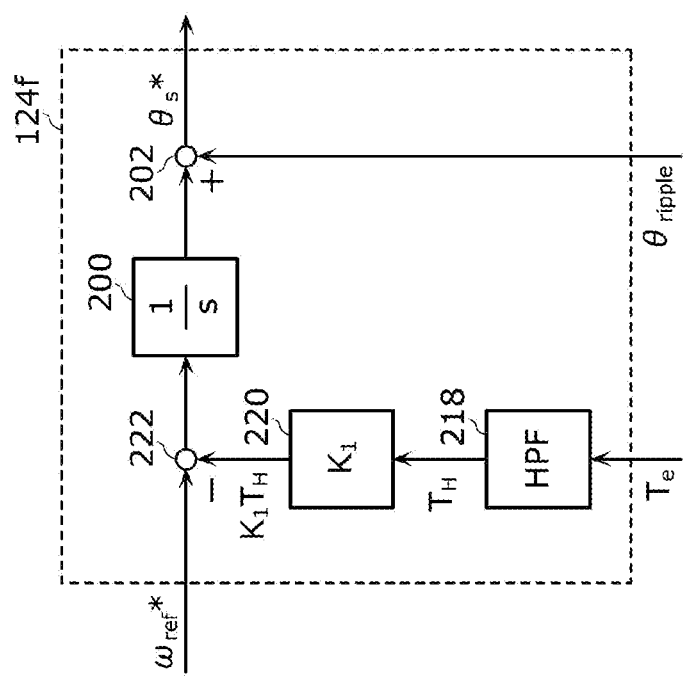
FIG. 19 is a block diagram of a command phase determiner included in a rotary machine control device according to Embodiment 7.

FIG. 19 is a block diagram of command phase determiner 124f included in the rotary machine control device according to Embodiment 7.

As shown in FIG. 19, the rotary machine control device according to Embodiment 7 is configured by replacing command phase determiner 124c of the rotary machine control device according to Embodiment 4 with command phase determiner 124f.

Command phase determiner 124f includes integrator 200, adder 202, high-pass filter 218, gain multiplier 220, and subtracter 222.

High-pass filter 218 outputs torque $T_H$ from estimated torque $T_e$.

Gain multiplier 220 multiplies torque $T_H$ by gain $K_1$.

Subtracter 222 subtracts KITH from command speed $\omega_{ref}^*$.

Integrator 200 integrates the value determined by subtracter 222.

Adder 202 adds ripple compensation phase $\theta_{ripple}$ to the value determined by integrator 200 to determine command phase $\theta_s^*$.

As described above, command phase determiner 124f may include integrator 200, adder 202, high-pass filter 218, gain multiplier 220, and subtracter 222.

Embodiment 8

Hereinafter, a rotary machine control device according to Embodiment 8 that is configured by changing a portion of the rotary machine control device according to Embodiment 7 will be described. Here, in the rotary machine control device according to Embodiment 8, structural elements that are the same as those of the rotary machine control device according to Embodiment 7 are given the same reference numerals, and a detailed description thereof will be omitted because they have already been described above. Accordingly, the following description will be given focusing on a difference from the rotary machine control device according to Embodiment 7.

Figure 20:
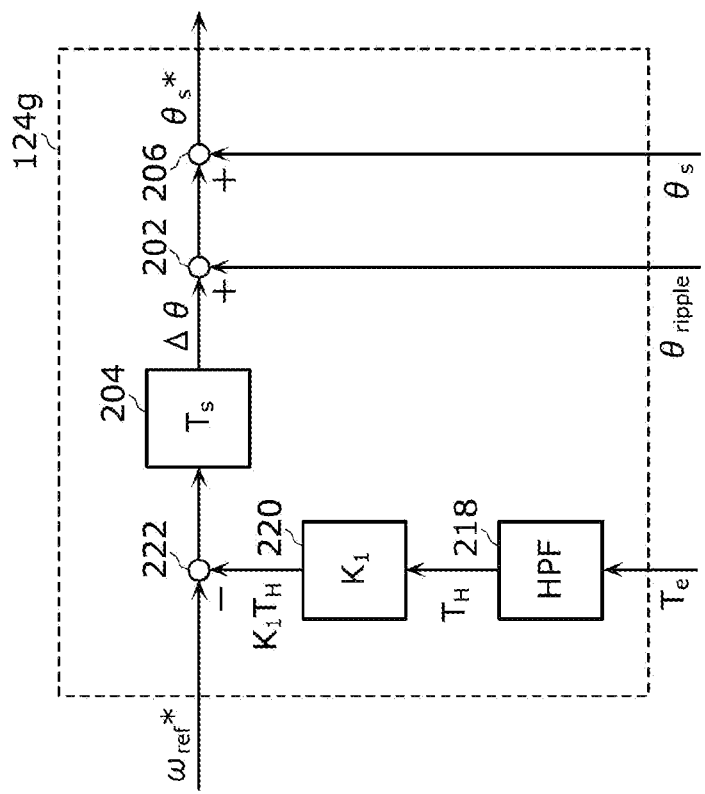
FIG. 20 is a block diagram of a command phase determiner included in a rotary machine control device according to Embodiment 8.

FIG. 20 is a block diagram of command phase determiner 124g included in the rotary machine control device according to Embodiment 8.

As shown in FIG. 20, the rotary machine control device according to Embodiment 8 is configured by replacing command phase determiner 124f of the rotary machine control device according to Embodiment 7 with command phase determiner 124g.

Command phase determiner 124g includes adder 202, multiplier 204, adder 206, high-pass filter 218, gain multiplier 220, and subtracter 222.

Adder 202 adds ripple compensation phase $\theta_{ripple}$ to movement amount 40 determined by multiplier 204.

Adder 206 adds estimated phase $\theta_s$ to the value determined by adder 202 to determine command phase $\theta_s^*$.

As described above, command phase determiner 124g may include adder 202, multiplier 204, adder 206, high-pass filter 218, gain multiplier 220, and subtracter 222.

Embodiment 9

Hereinafter, a rotary machine control device according to Embodiment 9 that is configured by changing a portion of the rotary machine control device according to Embodiment 8 will be described. Here, in the rotary machine control device according to Embodiment 9, structural elements that are the same as those of the rotary machine control device according to Embodiment 8 are given the same reference numerals, and a detailed description thereof will be omitted because they have already been described above. Accordingly, the following description will be given focusing on a difference from the rotary machine control device according to Embodiment 8.

Figure 21:
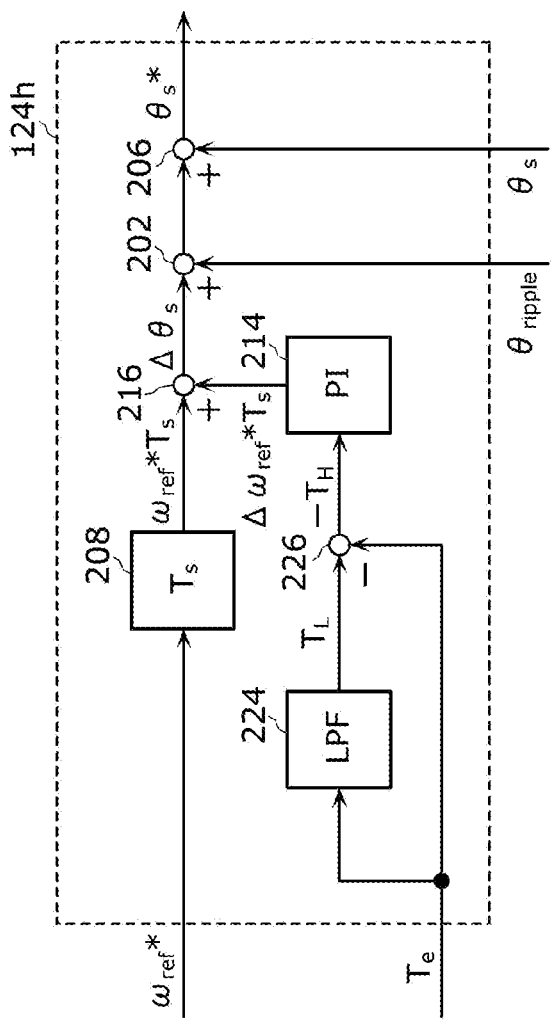
FIG. 21 is a block diagram of a command phase determiner included in a rotary machine control device according to Embodiment 9.

FIG. 21 is a block diagram of command phase determiner 124h included in the rotary machine control device according to Embodiment 9.

As shown in FIG. 21, the rotary machine control device according to Embodiment 9 is configured by replacing command phase determiner 124g of the rotary machine control device according to Embodiment 8 with command phase determiner 124h.

Command phase determiner 124h includes adder 202, adder 206, multiplier 208, PI compensator 214, adder 216, low-pass filter 224, and subtracter 226.

Multiplier 208 multiplies command speed $\omega_{ref}^*$ by $T_s$ to determine $\omega_{ref}^* T_s$.

Low-pass filter 224 outputs torque $T_L$ from estimated torque $T_e$.

Subtracter 226 subtracts estimated torque $T_e$ from torque $T_L$ to determine torque $-T_H$.

PI compensator 214 determines $\Delta\omega_{ref}^* T_s$ from torque $-T_H$.

Adder 216 adds $\omega_{ref}^* T_s$ determined by multiplier 208 and $\Delta\omega_{ref}^* T_s$ determined by PI compensator 214 to determine torque phase $\Delta\theta_s$.

Adder 202 adds ripple compensation phase $\theta_{ripple}$ to torque phase $\Delta\theta_s$ determined by adder 216.

Adder 206 adds estimated phase $\theta_s$ to the value determined by adder 202 to determine command phase $\theta_s^*$.

As described above, command phase determiner 124h may include adder 202, adder 206, multiplier 208, PI compensator 214, adder 216, low-pass filter 224, and subtracter 226.

Embodiment 10

Hereinafter, rotary machine control device 100j according to Embodiment 10 that is configured by changing a portion of rotary machine control device 100 according to Embodiment 1 will be described. Here, in rotary machine control device 100j according to Embodiment 10, structural elements that are the same as those of rotary machine control device 100 are given the same reference numerals, and a detailed description thereof will be omitted because they have already been described above. Accordingly, the following description will be given focusing on a difference from rotary machine control device 100.

Figure 22:
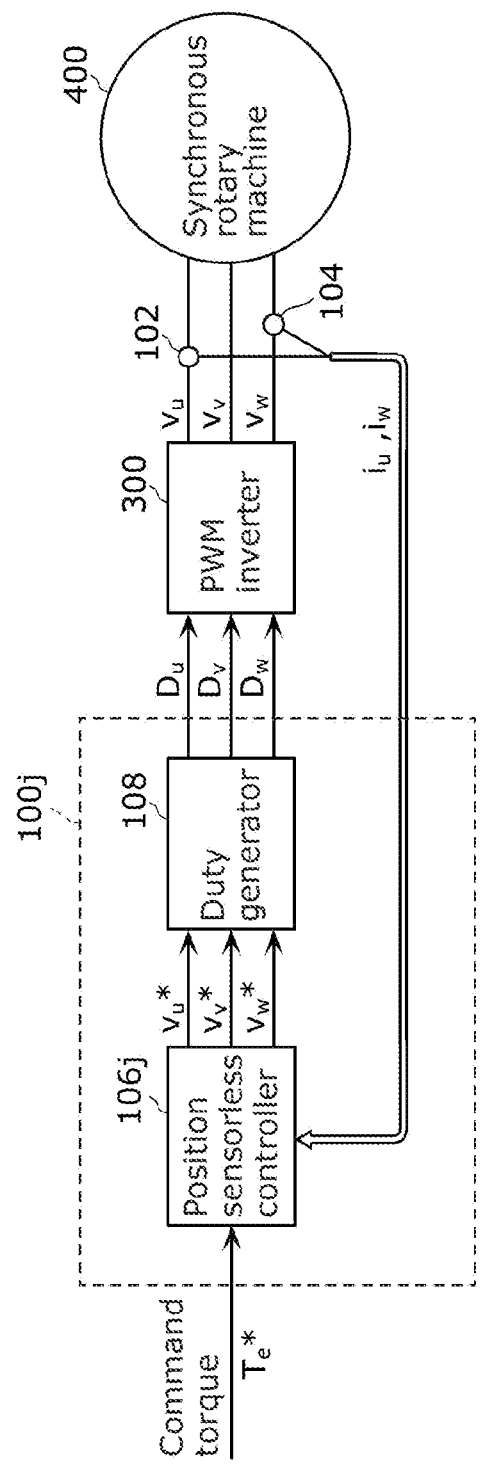
FIG. 22 is a block diagram of a rotary machine control device and the like according to Embodiment 10.

As shown in FIG. 22, rotary machine control device 100j includes first current sensor 102, second current sensor 104, position sensorless controller 106j, and duty generator 108. Rotary machine control device 100j is connected to PWM (Pulse Width Modulation) inverter 300 and synchronous rotary machine 400.

Position sensorless controller 106j performs position sensorless magnetic flux control of synchronous rotary machine 400. Position sensorless controller 106j is configured to perform the position sensorless magnetic flux control operation of synchronous rotary machine 400. In the present embodiment, during a period in which the position sensorless magnetic flux control operation is performed, the rotation speed (the number of rotations) of the rotor of synchronous rotary machine 400 matches the rotation speed (synchronous speed) of a rotary machine current that is applied to synchronous rotary machine 400. The position sensorless magnetic flux control operation is an operation performed without using an encoder and a position sensor such as a resolver. In the specification of the present application, for the sake of convenience of the description, an operation of controlling a rotary machine magnetic flux by using the phase of an estimated rotary machine magnetic flux will be referred to as a "magnetic flux control operation". The rotary machine magnetic flux conceptually includes both an armature interlinkage magnetic flux in a three-phase AC coordinate system that is applied to synchronous rotary machine 400 and a magnetic flux obtained by coordinate converting the armature interlinkage magnetic flux. In the specification of the present application, the term "amplitude" may also simply indicate magnitude (absolute value).

Some or all of the structural elements of rotary machine control device 100j may be provided by a control application executed by a DSP (Digital Signal Processor) or a microcomputer. The DSP or the microcomputer may include a core, a memory, an A/D conversion circuit, and peripheral devices such as a communication port. Also, some or all of the structural elements of rotary machine control device 100j may be configured using a logic circuit.

(Overview of Control of Rotary Machine Control Device 100j)

Rotary machine control device 100j generates duties $D_u$, $D_v$, and $D_w$ from command torque $T_e^*$ and phase currents $i_u$ and $i_w$. Voltage vectors $v_u$, $v_v$, and $v_w$ to be applied to synchronous rotary machine 400 are generated from duties $D_u$, $D_v$, and $D_w$ by PWM inverter 300. Command torque $T_e^*$ is input from an upper control device to rotary machine control device 100j. Command torque $T_e^*$ represents a torque to be followed by a motor torque.

Hereinafter, an overview of an operation performed by rotary machine control device 100j will be described. Phase currents $i_u$ and $i_w$ are detected by current sensors 102 and 104 (first current sensor 102 and second current sensor 104). During the operation of the position sensorless magnetic flux control operation, command voltage vectors $v_u^*$, $v_v^*$, and $v_w^*$ are generated from command torque $T_e^*$ and phase currents $i_u$ and $i_w$ by position sensorless controller 106j. The components of command voltage vectors $v_u^*$, $v_v^*$, and $v_w^*$ correspond to a U-phase voltage, a V-phase voltage, and a W-phase voltage on the three-phase AC coordinate, respectively. Duties $D_u$, $D_v$, and $D_w$ are generated from command voltage vectors $v_u^*$, $v_v^*$, and $v_w^*$ by duty generator 108. Duties $D_u$, $D_v$, and $D_w$ are input to PWM inverter 300. By performing control as described above, synchronous rotary machine 400 is controlled such that the torque follows command torque $T_e^*$.

Hereinafter, rotary machine control device 100j may be described based on a α-β coordinate system. Also, rotary machine control device 100j may also be described based on a d-q coordinate system. Also, rotary machine control device 100j may also be described based on a dm-qm coordinate system. FIG. 2 shows the α-β coordinate system, the d-q coordinate system, and the dm-qm coordinate system. The α-β coordinate system is a fixed coordinate system. The α-β coordinate system may also be called a stationary coordinate system or an AC coordinate system. The α axis is set as the axis extending in the same direction as the U axis (not shown in FIG. 2). The U axis corresponds to U-phase winding of rotary machine control device 100. The β axis is orthogonal to the α axis. The d-q coordinate system is a rotating coordinate system. The d-q coordinate system is a coordinate system with the d axis representing the phase of the rotor of synchronous rotary machine 400 and the q axis representing a phase shifted by 90 degrees from the phase of the rotor of synchronous rotary machine 400. The dm-qm coordinate system is a rotating coordinate system. The dm-qm coordinate system is a coordinate system with the dm axis representing magnet phase $\theta_{dm}$ that is the phase of magnet flux $\Psi_{am}$ that is an estimated magnetic flux of a permanent magnet included in synchronous rotary machine 400 and the qm axis representing a phase shifted by 90 degrees from magnet phase $\theta_{dm}$.

(Position Sensorless Controller 106j)

Referring back to FIG. 22, position sensorless controller 106j performs the position sensorless magnetic flux control operation to set a command amplitude such that the amplitude of the rotary machine magnetic flux converges on a target amplitude. The position sensorless magnetic flux control operation is performed by referencing command phase $\theta_s^*$ determined from the phase (estimated phase $\theta_s$) of the rotary machine magnetic flux estimated based on magnetic flux estimator 112 (described later). The target amplitude is an amplitude to be finally reached by the amplitude of the rotary machine magnetic flux. The command amplitude is an amplitude to be followed by the amplitude of the rotary machine magnetic flux.

Figure 23:
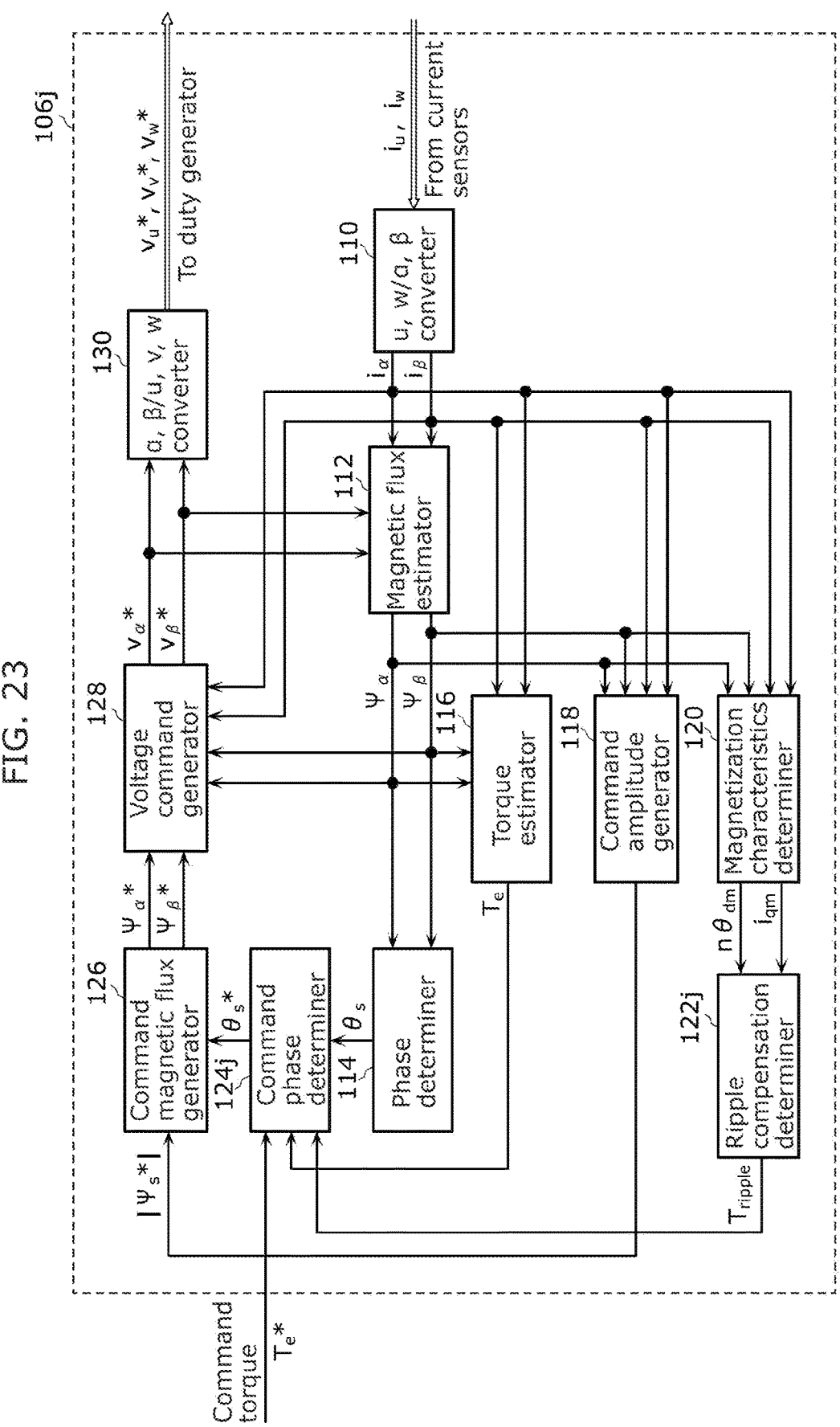
FIG. 23 is a block diagram of a position sensorless controller included in the rotary machine control device shown in FIG. 22.

As shown in FIG. 23, position sensorless controller 106j includes u, w/α, β converter 110, magnetic flux estimator 112, phase determiner 114, torque estimator 116, command amplitude generator 118, magnetization characteristics determiner 120, ripple compensation determiner 122j, command phase determiner 124j, command magnetic flux generator 126, voltage command generator 128, and α, β/u, v, w converter 130.

In position sensorless controller 106j, phase currents $i_u$ and $i_w$ are converted to axis currents $i_\alpha$ and $i_\beta$ by u, w/α, β converter 110. The expression "axis currents $i_\alpha$ and $i_\beta$" is a collective expression for α-axis current $i_\alpha$ and β-axis current $i_\beta$ on the α-β coordinate system of synchronous rotary machine 400. The rotary machine magnetic flux is estimated (estimated magnetic flux $\Psi_s$ is determined) by magnetic flux estimator 112. The α-axis component and the β-axis component of estimate magnetic flux $\Psi_s$ will be referred to as "estimated magnetic flux $\Psi_\alpha$" and "estimated magnetic flux $\Psi_\beta$", respectively. The phase of the rotary machine magnetic flux is estimated (estimated phase $\theta_s$ of estimated magnetic flux $\Psi_s$ is determined) from estimated magnetic flux $\Psi_s$ by phase determiner 114. The motor torque is estimated (estimated torque $T_e$ is determined) from estimated magnetic flux $\Psi_s$ and axis currents $i_\alpha$ and $i_\beta$ by torque estimator 116. Command amplitude $|\Psi_s^*|$ is generated from estimated magnetic flux $\Psi_s$ and axis currents $i_\alpha$ and $i_\beta$ by command amplitude generator 118. Qm-axis current $i_{qm}$ and harmonic component $n\theta_{dm}$ of magnet phase $\theta_{dm}$ are determined from estimated magnetic flux $\Psi_s$ and axis currents $i_\alpha$ and $i_\beta$ by magnetization characteristics determiner 120. Ripple compensation torque $T_{ripple}$ is determined from qm-axis current $i_{qm}$ and harmonic component $n\theta_{dm}$ by ripple compensation determiner 122j. The command phase (command magnetic flux vector phase) $\theta_s^*$ of command magnetic flux vector $\Psi_s^*$ is determined from estimated phase $\theta_s$ of estimated magnetic flux $\Psi_s$, command torque $T_e^*$, estimated torque $T_e$, and ripple compensation torque $T_{ripple}$ by command phase determiner 124j. Command magnetic flux vector $\Psi_s^*$ is determined from command amplitude $|\Psi_s^*|$ and command phase $\theta_s^*$ by command magnetic flux generator 126. The α-axis component and the β-axis component of command magnetic flux vector $\Psi_s^*$ will be referred to as "α-axis command magnetic flux $\Psi_\alpha^*$" and "β-axis command magnetic flux $\Psi_\beta^*$", respectively. Command axis voltages $v_\alpha^*$ and $v_\beta^*$ are determined from command magnetic fluxes $\Psi_\alpha^*$ and $\Psi_\beta^*$, estimated magnetic fluxes $\Psi_\alpha$ and $\Psi_\beta$, and axis currents $i_\alpha$ and $i_\beta$ by voltage command generator 128. The expression "command axis voltages $v_\alpha^*$ and $v_\beta^*$" is a collective expression for α-axis command axis voltage $v_\alpha^*$ and β-axis command axis voltage $v_\beta^*$ on the α-β coordinate system of synchronous rotary machine 400. Command axis voltages $v_\alpha^*$ and $v_\beta^*$ are converted to command voltage vectors $v_u^*$, $v_v^*$, and $v_w^*$ by α, β/u, v, w converter 130.

In the position sensorless magnetic flux control operation, by performing control as described above, the motor torque follows command torque $T_e^*$, the rotary machine magnetic flux follows command magnetic flux vector $\Psi_s^*$. As a result, the speed of synchronous rotary machine 400 follows command speed $\omega_{ref}^*$. In the above-described expression "position sensorless controller 106j performs the position sensorless magnetic flux control operation to set a command amplitude such that the amplitude of the rotary machine magnetic flux converges on a target amplitude", the target amplitude corresponds to command amplitude $|\Psi_s^*|$. By taking this into consideration, in the following description, command amplitude $|\Psi_s^*|$ may also be referred to as "target amplitude $|\Psi_s^*|$".

In the specification of the present application, axis currents $i_\alpha$ and $i_\beta$ mean current values that are transmitted as information, rather than electric currents that actually flow through synchronous rotary machine 400. Command axis voltages $v_\alpha^*$ and $v_\beta^*$, estimated magnetic flux $\Psi_s$, estimated phase $\theta_s$, command phase $\theta_s^*$, estimated torque $T_e$, command torque $T_e^*$, command amplitude $|\Psi_s^*|$ (target amplitude $|\Psi_s^*|$), command magnetic flux vector $\Psi_s^*$, command voltage vectors $v_u^*$, $v_v^*$, and $v_w^*$, command speed $\omega_{ref}^*$, magnet phase $\theta_{dm}$, harmonic component $n\theta_{dm}$, and qm-axis current $i_{qm}$, and the like also mean values that are transmitted as information.

The structural elements of position sensorless controller 106j shown in FIG. 23 will be described below.
(Ripple Compensation Determiner 122j)

Figure 24:
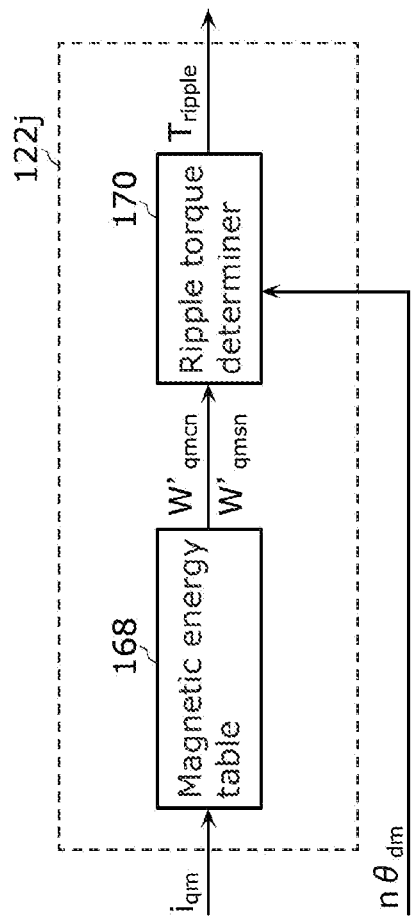
FIG. 24 is a block diagram of a ripple compensation determiner included in the position sensorless controller shown in FIG. 23.

As shown in FIG. 24, ripple compensation determiner 122j determines ripple compensation torque $T_{ripple}$ based on qm-axis current $i_{qm}$ and harmonic component $n\theta_{dm}$. Ripple compensation determiner 122j includes magnetic energy table 168 and ripple torque determiner 170.

Ripple compensation determiner 122j determines magnetic energy $W'_{qmcn}$ and magnetic energy $W'_{qmsn}$ by using qm-axis current $i_{qm}$ output from α, β/qm converter 148 and magnetic energy table 168 (see FIG. 7) created by magnetic energy determiner 156. Specifically, ripple compensation determiner 122j selects, from magnetic energy table 168, a value of magnetic energy $W'_{qmcn}$ that corresponds to the value of qm-axis current $i_{qm}$ output from α, β/qm converter 148, and outputs the selected value. Also, ripple compensation determiner 122j selects, from magnetic energy table 168, a value of magnetic energy $W'_{qmsn}$ that corresponds to the value of qm-axis current $i_{qm}$ output from α, β/qm converter 148, and outputs the selected value.
(Command Phase Determiner 124j)

Referring back to FIG. 23, command phase determiner 124j determines the command magnetic flux vector phase based on ripple compensation phase $\theta_{ripple}$ determined based on ripple compensation torque $T_{ripple}$ by resonator 189 (described later) and a torque command or a rotation speed command. Here, an example will be described in which the command magnetic flux vector phase is determined by using the torque command. The command magnetic flux vector phase is command phase $\theta_s^*$. That is, in the present embodiment, as shown in FIG. 2, command phase $\theta_s^*$ is the phase of command magnetic flux vector $\Psi_s^*$. In the present embodiment, command phase determiner 124j determines command phase $\theta_s^*$ by adding torque phase $\Delta\theta_s$ for converging estimated torque $T_e$ on command torque $T_e^*$, ripple compensation phase $\theta_{ripple}$, and estimated phase $\theta_s$. That is, command phase determiner 124j determines command phase $\theta_s^*$ by using torque phase $\Delta\theta_s$, ripple compensation phase $\theta_{ripple}$, and estimated phase $\theta_s$.

Figure 25:
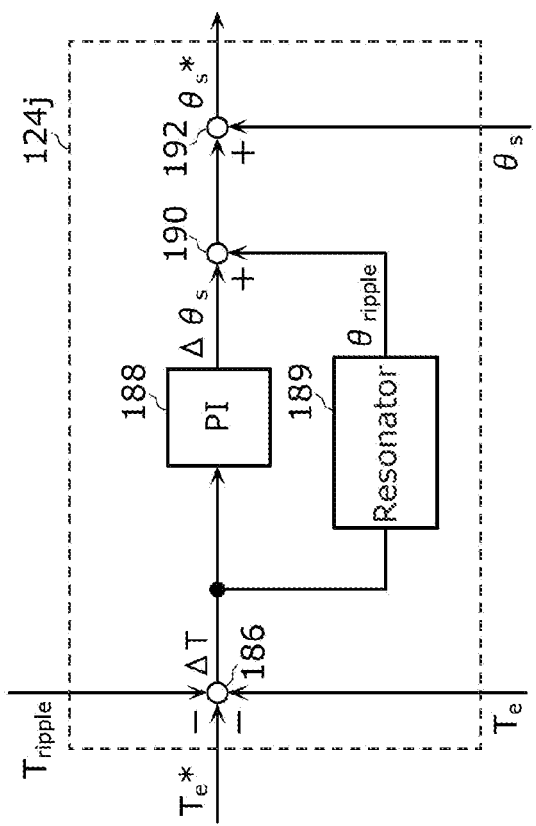
FIG. 25 is a block diagram of a command phase determiner included in the position sensorless controller shown in FIG. 23.

As shown in FIG. 25, command phase determiner 124j includes subtracter 186, PI compensator 188, resonator 189, adder 190, and adder 192.

Subtracter 186 subtracts estimated torque $T_e$ and ripple compensation torque $T_{ripple}$ from command torque $T_e^*$ to determine deviation $\Delta T$.

PI compensator 188 determines torque phase $\Delta\theta_s$ by performing proportional-integral control for converging deviation $\Delta T$ determined by subtracter 186 on 0.

Resonator 189 determines ripple compensation phase $\theta_{ripple}$ by using deviation $\Delta T$ based on Equation (26). Here, $b_0$ represents a coefficient, and is a preset constant. Also, ξ represents a damping coefficient, $\omega_n$ represents a natural frequency, and s represents a transfer function.

[Math. 26]

$$\theta_{ripple} = b_0 \Delta T / (s^2 + 2\xi\omega_n s + \omega_n^2) \tag{26}$$

In the manner as described above, resonator 189 determines ripple compensation phase $\theta_{ripple}$ based on ripple compensation torque $T_{ripple}$. For example, resonator 189 is a resonator device.

Adder 190 adds torque phase $\Delta\theta_s$ and ripple compensation phase $\theta_{ripple}$.

Adder 192 further adds estimated phase $\theta_s$ to torque phase $\Delta\theta_s$ and ripple compensation phase $\theta_{ripple}$ to determine command phase $\theta_s^*$.
Advantageous Effects, etc.

Rotary machine control device 100j according to Embodiment 10 includes: magnetic flux estimator 112 that estimates a rotary machine magnetic flux that is a magnetic flux of synchronous rotary machine 400; command amplitude generator 118 that generates command amplitude $|\Psi_s^*|$ that is an amplitude of command magnetic fluxes $\Psi_\alpha^*$ and $\Psi_\beta^*$ by executing feedback control that uses a first inner product or a second inner product, the first inner product being a product of estimated magnetic flux $\Psi_s$ that is the estimated rotary machine magnetic flux and detection current i of synchronous rotary machine 400, the second inner product being a product of detection current i of synchronous rotary machine 400 and estimated magnet flux $\Psi_{am}$ of a permanent magnet included in synchronous rotary machine 400; magnetization characteristics determiner 120 that determines magnet phase $\theta_{dm}$ that is a phase of magnet flux $\Psi_{am}$ based on estimated magnetic flux $\Psi_s$ and detection current i, and also determines qm-axis magnetic flux $\Psi_{qm}$ of estimated magnetic flux $\Psi_s$, qm-axis current $i_{qm}$ of detection current i, and harmonic component $n\theta_{dm}$ of magnet phase $\theta_{dm}$ by using a dm-qm coordinate system with the dm axis representing magnet phase $\theta_{dm}$ and the qm axis representing a phase shifted by 90 degrees from magnet phase $\theta_{dm}$; ripple compensation determiner 122j that determines ripple compensation torque $T_{ripple}$ based on qm-axis current $i_{qm}$ and harmonic component $n\theta_{dm}$; command phase determiner 124*j* that determines command phase $\theta_s^*$ based on ripple compensation phase $\theta_{ripple}$ determined based on ripple compensation torque $T_{ripple}$ by resonator 189 and a torque command or a rotation speed command; and command magnetic flux generator 126 that generates command magnetic fluxes $\Psi_\alpha^*$ and $\Psi_\beta^*$ based on command amplitude $|\Psi_s^*|$ and command phase $\theta_s^*$.

With this configuration, magnet phase $\theta_{dm}$ can be determined; qm-axis magnetic flux $\Psi_{am}$ of estimated magnetic flux $\Psi_s$, qm-axis current $i_{qm}$ of detection current i, and harmonic component $n\theta_{dm}$ of magnet phase $\theta_{dm}$ can be determined by using a dm-qm coordinate system with the dm axis representing magnet phase $\theta_{dm}$ and the qm axis representing a phase shifted by 90 degrees from magnet phase $\theta_{dm}$; ripple compensation torque $T_{ripple}$ can be determined based on qm-axis current $i_{qm}$ and harmonic component $n\theta_{dm}$; and command phase $\theta_s^*$ can be determined based on ripple compensation phase $\theta_{ripple}$ determined based on ripple compensation torque $T_{ripple}$ and a torque command or a rotation speed command. Accordingly, in the position sensorless magnetic flux control, the torque ripple can be effectively reduced.

Also, in Embodiment 10, as described with reference to FIG. 25, ripple compensation phase $\theta_{ripple}$ is determined by using estimated torque $T_e$, and thus the torque ripple can be reduced with high accuracy.

Also, rotary machine control device 100*j* according to Embodiment 10 further includes: phase determiner 114 that determines estimated phase $\theta_s$ that is a phase of estimated magnetic flux $\Psi_s$ based on estimated magnetic flux $\Psi_s$; and torque estimator 116 that computes estimated torque $T_e$ based on estimated magnetic flux $\Psi_s$ and detection current i. Command phase determiner 124*j* determines command phase $\theta_s^*$ by adding torque phase $\Delta\theta_s$ for converging estimated torque $T_e$ on command torque $T_e^*$, ripple compensation phase $\theta_{ripple}$, and estimated phase $\theta_s$.

With this configuration, command phase $\theta_s^*$ can be determined by adding torque phase $\Delta\theta_s$ for converging estimated torque $T_e$ on command torque $T_e^*$, ripple compensation phase $\theta_{ripple}$, and estimated phase $\theta_s$, and thus, in the position sensorless magnetic flux control, the torque ripple can be more effectively reduced.

Also, in rotary machine control device 100*j* according to Embodiment 10, command amplitude generator 118 sets a target value of a result of computation of the first inner product or the second inner product to zero.

With this configuration, it is possible to cause electric current that generates a field magnetic flux in the direction of magnet flux $\Psi_{am}$ of the permanent magnet of synchronous rotary machine 400 to flow. Accordingly, the torque ripple can be more effectively reduced.

Embodiment 11

Hereinafter, a rotary machine control device according to Embodiment 11 that is configured by changing a portion of rotary machine control device 100*j* according to Embodiment 10 will be described. Here, in the rotary machine control device according to Embodiment 11, structural elements that are the same as those of rotary machine control device 100*j* are given the same reference numerals, and a detailed description thereof will be omitted because they have already been described above. Accordingly, the following description will be given focusing on a difference from rotary machine control device 100*j*.

FIG. 12 is a block diagram of command amplitude generator 118*a* included in the rotary machine control device according to Embodiment 2.

As shown in FIG. 12, the rotary machine control device according to Embodiment 11 is configured by replacing command amplitude generator 118 of rotary machine control device 100*j* according to Embodiment 10 with command amplitude generator 118*a*.

Embodiment 12

Hereinafter, a rotary machine control device according to Embodiment 12 that is configured by changing a portion of rotary machine control device 100*j* according to Embodiment 10 will be described. Here, in the rotary machine control device according to Embodiment 12, structural elements that are the same as those of rotary machine control device 100*j* are given the same reference numerals, and a detailed description thereof will be omitted because they have already been described above. Accordingly, the following description will be given focusing on a difference from rotary machine control device 100*j*.

FIG. 13 is a block diagram of magnetization characteristics determiner 120*b* included in the rotary machine control device according to Embodiment 3. FIG. 14 is a block diagram of magnetization characteristics determiner 120*c* that is another magnetization characteristics determiner included in the rotary machine control device according to Embodiment 3.

As shown in FIG. 13, the rotary machine control device according to Embodiment 12 is configured by replacing magnetization characteristics determiner 120 of rotary machine control device 100*j* according to Embodiment 10 with magnetization characteristics determiner 120*b*.

Magnetization characteristics determiner 120*b* shown in FIG. 13 may be replaced with magnetization characteristics determiner 120*c* shown in FIG. 14.

Embodiment 13

Hereinafter, a rotary machine control device according to Embodiment 13 that is configured by changing a portion of rotary machine control device 100*j* according to Embodiment 10 will be described. Here, in the rotary machine control device according to Embodiment 13, structural elements that are the same as those of rotary machine control device 100*j* are given the same reference numerals, and a detailed description thereof will be omitted because they have already been described above. Accordingly, the following description will be given focusing on a difference from rotary machine control device 100*j*.

Figure 26:
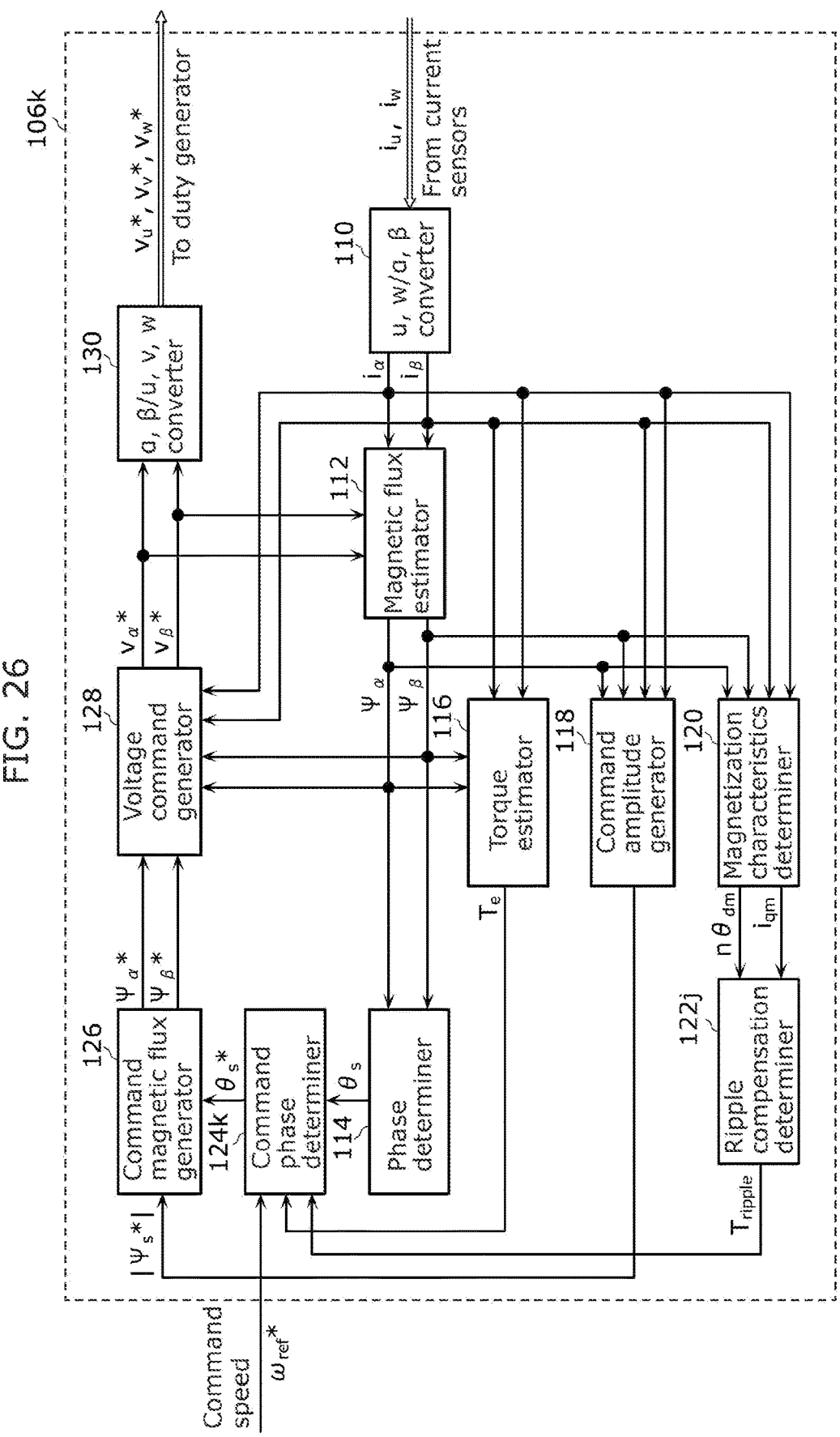
FIG. 26 is a block diagram of a position sensorless controller included in a rotary machine control device according to Embodiment 13.
Figure 27:
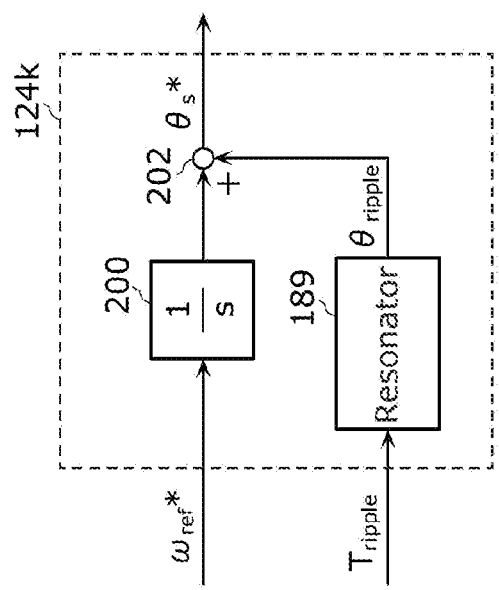
FIG. 27 is a block diagram of a command phase determiner included in the position sensorless controller shown in FIG. 26.

FIG. 26 is a block diagram of position sensorless controller 106*k* included in the rotary machine control device according to Embodiment 13. FIG. 27 is a block diagram of command phase determiner 124*k* included in position sensorless controller 106*k* shown in FIG. 26.

As shown in FIG. 26, the rotary machine control device according to Embodiment 13 is configured by replacing position sensorless controller 106*j* of rotary machine control device 100*j* according to Embodiment 10 with position sensorless controller 106*k*.

Position sensorless controller 106*k* is different from position sensorless controller 106*j* mainly in that position sensorless controller 106*k* includes command phase determiner 124*k*, instead of command phase determiner 124*j*.

In the present embodiment, command speed $\omega_{ref}^*$ is input to position sensorless controller 106*k*. Command speed $\omega_{ref}^*$ represents a speed to be followed by synchronous rotary machine 400. Position sensorless controller 106k generates command voltage vectors $v_u^*$, $v_v^*$, and $v_w^*$ from command speed $\omega_{ref}^*$ and phase currents $i_u$ and $i_w$. By performing control as described above, synchronous rotary machine 400 is controlled such that the speed of synchronous rotary machine 400 follows command speed $\omega_{ref}^*$.

As shown in FIG. 27, command phase determiner 124k includes resonator 189, integrator 200, and adder 202. Command phase determiner 124k determines command phase $\theta_s^*$ based on ripple compensation phase $\theta_{ripple}$ and a rotation speed command.

Resonator 189 determines ripple compensation phase $\theta_{ripple}$ based on ripple compensation torque $T_{ripple}$. For example, resonator 189 determines ripple compensation phase $\theta_{ripple}$ through calculation performed by replacing $\Delta T$ in Equation (26) described above with $T_{ripple}$.

Integrator 200 integrates command speed $\omega_{ref}^*$.

Adder 202 adds ripple compensation phase $\theta_{ripple}$ to the value determined by integrator 200 to determine command phase $\theta_s^*$.

As described above, the rotary machine control device may include position sensorless controller 106k instead of position sensorless controller 106j.

Embodiment 14

Hereinafter, a rotary machine control device according to Embodiment 14 that is configured by changing a portion of the rotary machine control device according to Embodiment 13 will be described. Here, in the rotary machine control device according to Embodiment 14, structural elements that are the same as those of the rotary machine control device according to Embodiment 13 are given the same reference numerals, and a detailed description thereof will be omitted because they have already been described above. Accordingly, the following description will be given focusing on a difference from the rotary machine control device according to Embodiment 13.

Figure 28:
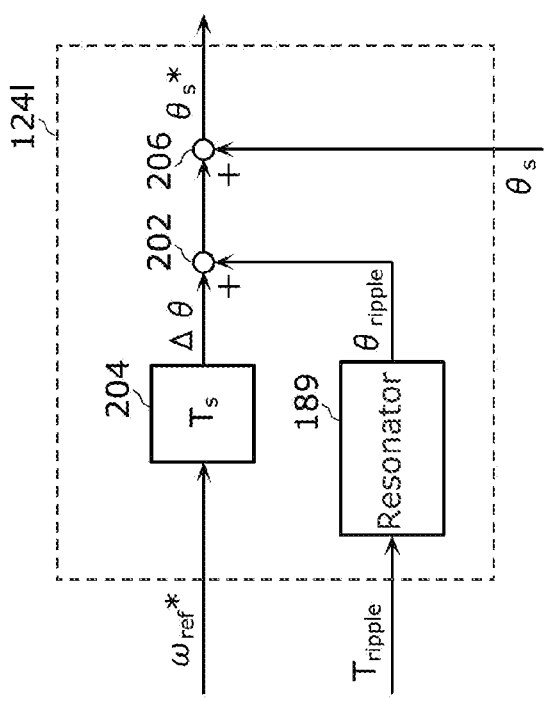
FIG. 28 is a block diagram of a command phase determiner included in a rotary machine control device according to Embodiment 14.

FIG. 28 is a block diagram of command phase determiner 124l included in the rotary machine control device according to Embodiment 14.

As shown in FIG. 28, the rotary machine control device according to Embodiment 14 is configured by replacing command phase determiner 124k of the rotary machine control device according to Embodiment 13 with command phase determiner 124l.

Command phase determiner 124l: (i) determines movement amount 40 of estimated phase $\theta_s$ of estimated magnetic flux $\Psi_s$ for each control cycle by which estimated phase $\theta_s$ needs to move by using a rotation speed command input to synchronous rotary machine 400; and (ii) determines command phase $\theta_s^*$ by using determined movement amount $\Delta\theta$ and ripple compensation phase $\theta_{ripple}$. Command phase determiner 124l includes resonator 189, adder 202, multiplier 204, and adder 206.

Multiplier 204 multiplies command speed $\omega_{ref}^*$ by $T_s$ to determine movement amount $\Delta\theta$. Here, $T_s$ represents a control cycle.

Adder 202 adds ripple compensation phase $\theta_{ripple}$ to movement amount $\Delta\theta$.

Adder 206 adds estimated phase $\theta_s$ to the value determined by adder 202 to determine command phase $\theta_s^*$.

As described above, command phase determiner 124l may include resonator 189, adder 202, multiplier 204, and adder 206.

The rotary machine control device according to Embodiment 14 further includes phase determiner 114 that determines estimated phase $\theta_s$ that is the phase of estimated magnetic flux $\Psi_s$ based on estimated magnetic flux $\Psi_s$. Command phase determiner 124l: (i) determines movement amount $\Delta\theta$ of estimated phase $\Psi_s$ for each control cycle by which estimated phase $\Psi_s$ needs to move by using a rotation speed command input to synchronous rotary machine 400; and (ii) determines command phase $\theta_s^*$ by using determined movement amount $\Delta\theta$, ripple compensation phase $\theta_{ripple}$, and estimated phase $\theta_s$.

With this configuration, command phase $\theta_s^*$ can be determined by using movement amount $\Delta\theta$ of estimated phase $\Psi_s$ for each control cycle by which estimated phase $\Psi_s$ needs to move, ripple compensation phase $\theta_{ripple}$, and estimated phase $\theta_s$. Accordingly, in the position sensorless magnetic flux control, the torque ripple can be more effectively reduced.

Embodiment 15

Hereinafter, a rotary machine control device according to Embodiment 15 that is configured by changing a portion of the rotary machine control device according to Embodiment 14 will be described. Here, in the rotary machine control device according to Embodiment 15, structural elements that are the same as those of the rotary machine control device according to Embodiment 14 are given the same reference numerals, and a detailed description thereof will be omitted because they have already been described above. Accordingly, the following description will be given focusing on a difference from the rotary machine control device according to Embodiment 14.

Figure 29:
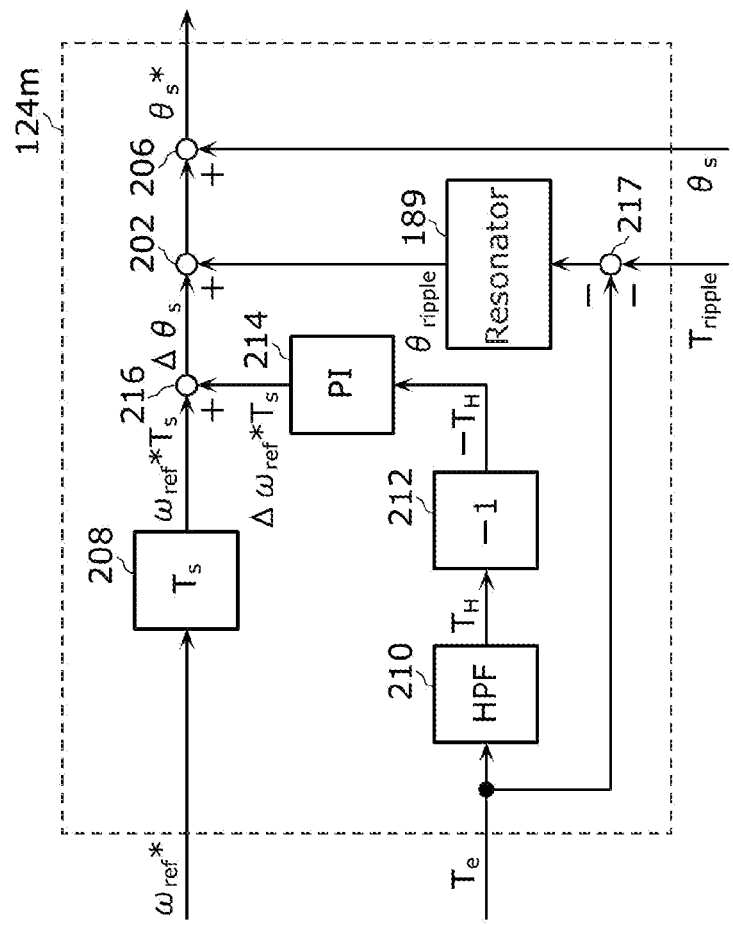
FIG. 29 is a block diagram of a command phase determiner included in a rotary machine control device according to Embodiment 15.

FIG. 29 is a block diagram of command phase determiner 124m included in the rotary machine control device according to Embodiment 15.

As shown in FIG. 29, the rotary machine control device according to Embodiment 15 is configured by replacing command phase determiner 124l of the rotary machine control device according to Embodiment 14 with command phase determiner 124m.

Command phase determiner 124m determines command phase $\theta_s^*$ by further using estimated torque $T_e$. Command phase determiner 124m includes resonator 189, adder 202, adder 206, multiplier 208, high-pass filter 210, sign inverter 212, PI compensator 214, adder 216, and subtracter 217.

Multiplier 208 multiplies command speed $\omega_{ref}^*$ by $T_s$ to determine $\omega_{ref}^* T_s$.

High-pass filter 210 outputs torque $T_H$ from estimated torque $T_e$.

Sign inverter 212 inverts the sign of torque $T_H$.

PI compensator 214 determines $\Delta\omega_{ref}^* T_s$ from torque $-T_H$.

Adder 216 adds $\omega_{ref}^* T_s$ determined by multiplier 208 and $\Delta\omega_{ref}^* T_s$ determined by PI compensator 214 to determine torque phase $\Delta\theta_s$.

Subtracter 217 subtracts $T_e$ from $-T_{ripple}$.

Resonator 189 determines ripple compensation phase $\theta_{ripple}$ based on ripple compensation torque $T_{ripple}$. For example, resonator 189 determines ripple compensation phase $\theta_{ripple}$ through calculation performed by replacing $\Delta T$ in Equation (26) described above with $-T_{ripple}-T_e$.

Adder 202 adds ripple compensation phase $\theta_{ripple}$ to torque phase $\Delta\theta_s$.

Adder 206 adds estimated phase $\theta_s$ to the value determined by adder 202 to determine command phase $\theta_s^*$.

As described above, command phase determiner 124*m* may include resonator 189, adder 202, adder 206, multiplier 208, high-pass filter 210, sign inverter 212, PI compensator 214, adder 216, and subtracter 217.

The rotary machine control device according to Embodiment 15 further includes torque estimator 116 that computes estimated torque $T_e$ based on estimated magnetic flux $\Psi_s$ and detection current i, and command phase determiner 124*m* determines command phase $\theta_s{}^*$ by further using estimated torque $T_e$.

With this configuration, command phase $\theta_s$ can be determined by further using estimated torque $T_e$. Accordingly, in the position sensorless magnetic flux control, the torque ripple can be more effectively reduced.

Embodiment 16

Hereinafter, a rotary machine control device according to Embodiment 16 that is configured by changing a portion of the rotary machine control device according to Embodiment 13 will be described. Here, in the rotary machine control device according to Embodiment 16, structural elements that are the same as those of the rotary machine control device according to Embodiment 13 are given the same reference numerals, and a detailed description thereof will be omitted because they have already been described above. Accordingly, the following description will be given focusing on a difference from the rotary machine control device according to Embodiment 13.

Figure 30:
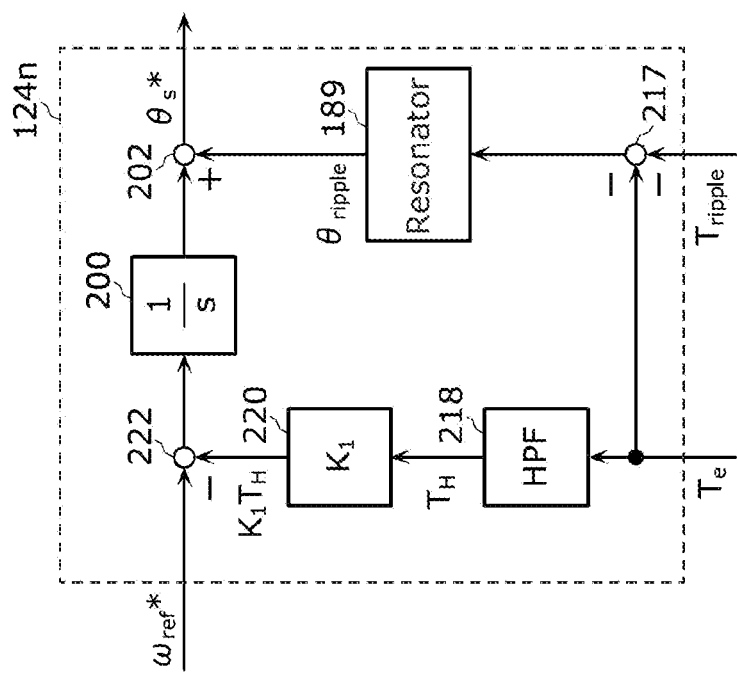
FIG. 30 is a block diagram of a command phase determiner included in a rotary machine control device according to Embodiment 16.

FIG. 30 is a block diagram of command phase determiner 124*n* included in the rotary machine control device according to Embodiment 16.

As shown in FIG. 30, the rotary machine control device according to Embodiment 16 is configured by replacing command phase determiner 124*k* of the rotary machine control device according to Embodiment 13 with command phase determiner 124*n*.

Command phase determiner 124*n* includes resonator 189, integrator 200, adder 202, subtracter 217, high-pass filter 218, gain multiplier 220, and subtracter 222.

High-pass filter 218 outputs torque $T_H$ from estimated torque $T_e$.

Gain multiplier 220 multiplies torque $T_H$ by gain $K_1$.

Subtracter 222 subtracts $K_1 T_H$ from command speed $\omega_{ref}{}^*$.

Integrator 200 integrates the value determined by subtracter 222.

Subtracter 217 subtracts $T_e$ from $-T_{ripple}$.

Resonator 189 determines ripple compensation phase $\theta_{ripple}$ based on ripple compensation torque $T_{ripple}$. For example, resonator 189 determines ripple compensation phase $\theta_{ripple}$ through calculation performed by replacing $\Delta T$ in Equation (26) described above with $-T_{ripple} - T_e$.

Adder 202 adds ripple compensation phase $\theta_{ripple}$ to the value determined by integrator 200 to determine command phase $\theta_s{}^*$.

As described above, command phase determiner 124*n* may include resonator 189, integrator 200, adder 202, subtracter 217, high-pass filter 218, gain multiplier 220, and subtracter 222.

Embodiment 17

Hereinafter, a rotary machine control device according to Embodiment 17 that is configured by changing a portion of the rotary machine control device according to Embodiment 16 will be described. Here, in the rotary machine control device according to Embodiment 17, structural elements that are the same as those of the rotary machine control device according to Embodiment 16 are given the same reference numerals, and a detailed description thereof will be omitted because they have already been described above. Accordingly, the following description will be given focusing on a difference from the rotary machine control device according to Embodiment 16.

Figure 31:
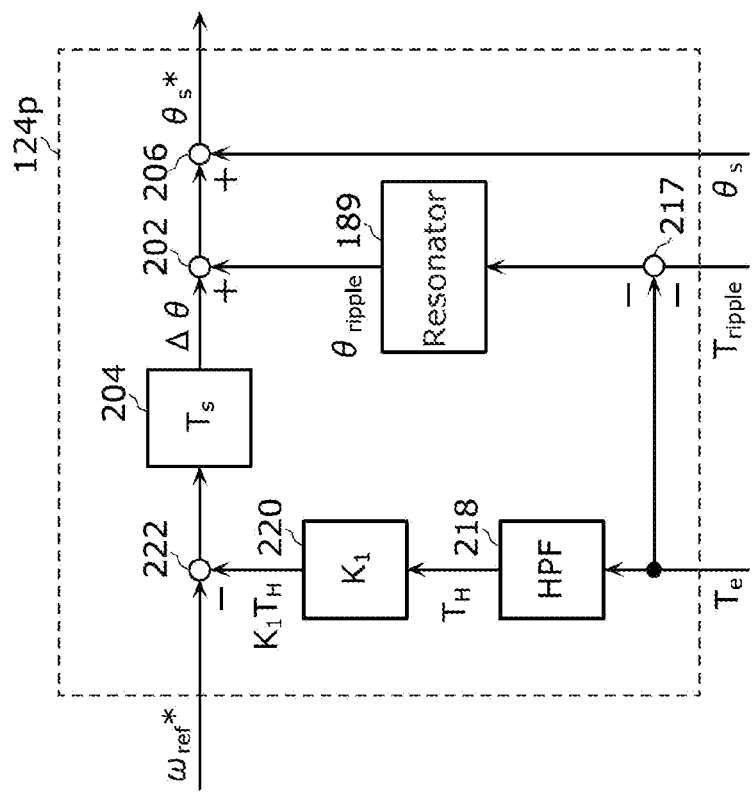
FIG. 31 is a block diagram of a command phase determiner included in a rotary machine control device according to Embodiment 17.

FIG. 31 is a block diagram of command phase determiner 124*p* included in the rotary machine control device according to Embodiment 17.

As shown in FIG. 31, the rotary machine control device according to Embodiment 17 is configured by replacing command phase determiner 124*n* of the rotary machine control device according to Embodiment 16 with command phase determiner 124*p*.

Command phase determiner 124*p* includes resonator 189, adder 202, multiplier 204, adder 206, subtracter 217, high-pass filter 218, gain multiplier 220, and subtracter 222.

Adder 202 adds ripple compensation phase $\theta_{ripple}$ to movement amount $\Delta\theta$ determined by multiplier 204.

Adder 206 adds estimated phase $\theta_s$ to the value determined by adder 202 to determine command phase $\theta_s{}^*$.

As described above, command phase determiner 124*p* may include resonator 189, adder 202, multiplier 204, adder 206, subtracter 217, high-pass filter 218, gain multiplier 220, and subtracter 222.

Embodiment 18

Hereinafter, a rotary machine control device according to Embodiment 18 that is configured by changing a portion of the rotary machine control device according to Embodiment 17 will be described. Here, in the rotary machine control device according to Embodiment 18, structural elements that are the same as those of the rotary machine control device according to Embodiment 17 are given the same reference numerals, and a detailed description thereof will be omitted because they have already been described above. Accordingly, the following description will be given focusing on a difference from the rotary machine control device according to Embodiment 17.

Figure 32:
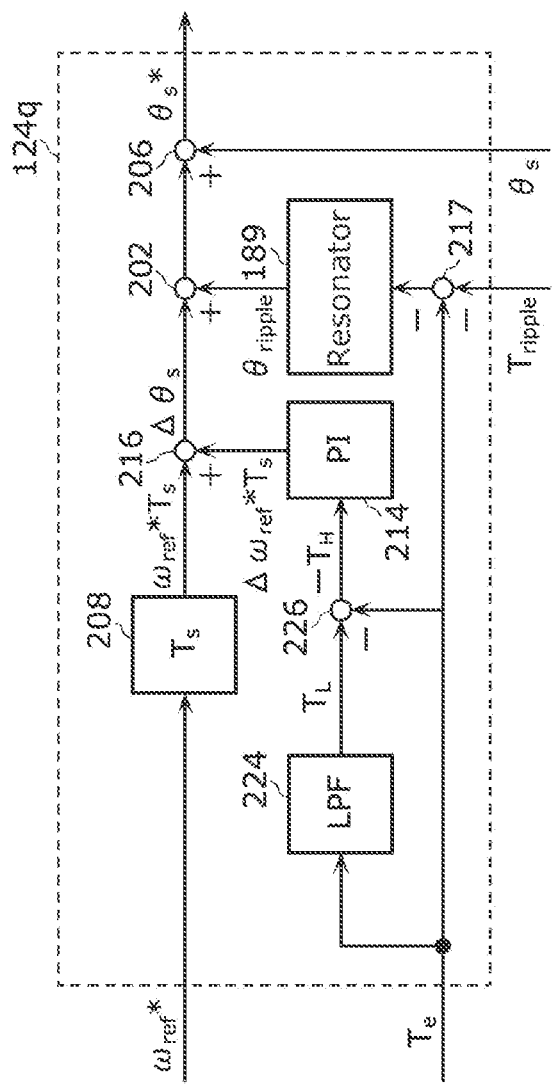
FIG. 32 is a block diagram of a command phase determiner included in a rotary machine control device according to Embodiment 18.

FIG. 32 is a block diagram of command phase determiner 124*q* included in the rotary machine control device according to Embodiment 18.

As shown in FIG. 32, the rotary machine control device according to Embodiment 18 is configured by replacing command phase determiner 124*p* of the rotary machine control device according to Embodiment 17 with command phase determiner 124*q*.

Command phase determiner 124*q* includes resonator 189, adder 202, adder 206, multiplier 208, PI compensator 214, adder 216, subtracter 217, low-pass filter 224, and subtracter 226.

Multiplier 208 multiplies command speed $\omega_{ref}{}^*$ by $T_s$ to determine $\omega_{ref}{}^* T_s$.

Low-pass filter 224 outputs torque $T_L$ from estimated torque $T_e$.

Subtracter 226 subtracts estimated torque $T_e$ from torque $T_L$ to determine torque $-T_H$.

PI compensator 214 determines $\Delta\omega_{ref}{}^* T_s$ from torque $-T_H$. Adder 216 adds $\omega_{ref}{}^* T_s$ determined by multiplier 208 and $\Delta\omega_{ref}{}^* T_s$ determined by PI compensator 214 to determine torque phase $\Delta\theta_s$.

Adder 202 adds ripple compensation phase $\theta_{ripple}$ to torque phase $\Delta\theta_s$ determined by adder 216.

Adder 206 adds estimated phase $\theta_s$ to the value determined by adder 202 to determine command phase $\theta_s^*$.

As described above, command phase determiner 124q may include resonator 189, adder 202, adder 206, multiplier 208, PI compensator 214, adder 216, subtracter 217, low-pass filter 224, and subtracter 226.

Embodiment 19

Hereinafter, rotary machine control device 100r according to Embodiment 19 that is configured by changing a portion of rotary machine control device 100 according to Embodiment 1 will be described. Here, in rotary machine control device 100r according to Embodiment 19, structural elements that are the same as those of rotary machine control device 100 are given the same reference numerals, and a detailed description thereof will be omitted because they have already been described above. Accordingly, the following description will be given focusing on a difference from rotary machine control device 100.

Figure 33:
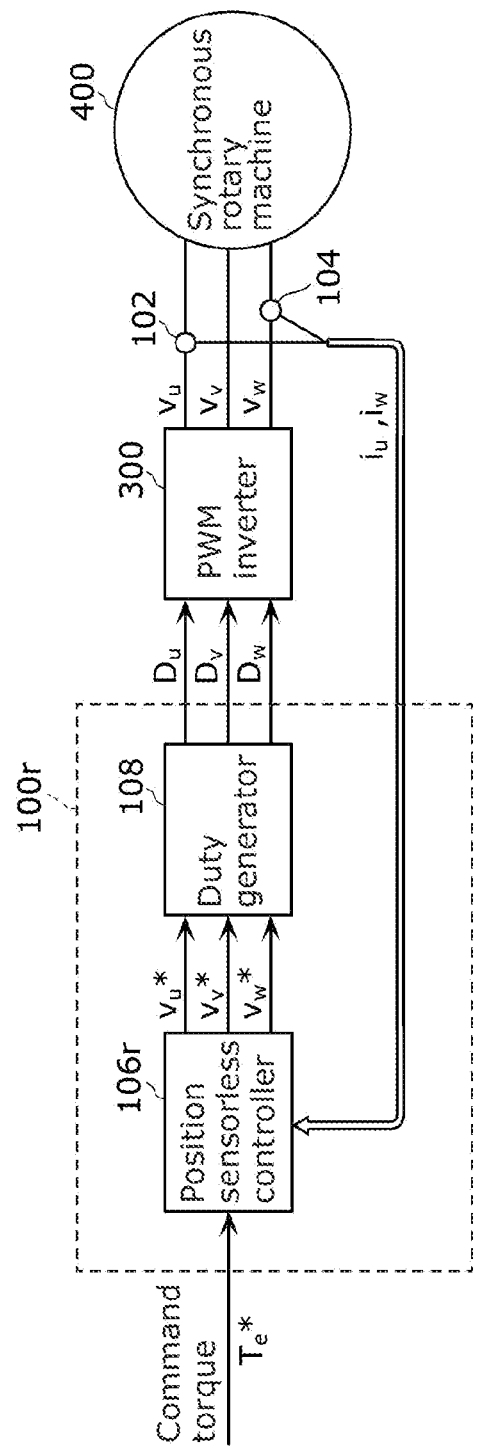
FIG. 33 is a block diagram of a rotary machine control device and the like according to Embodiment 19.

As shown in FIG. 33, rotary machine control device 100r is configured by replacing position sensorless controller 106 of rotary machine control device 100 according to Embodiment 1 with position sensorless controller 106r.

Figure 34:
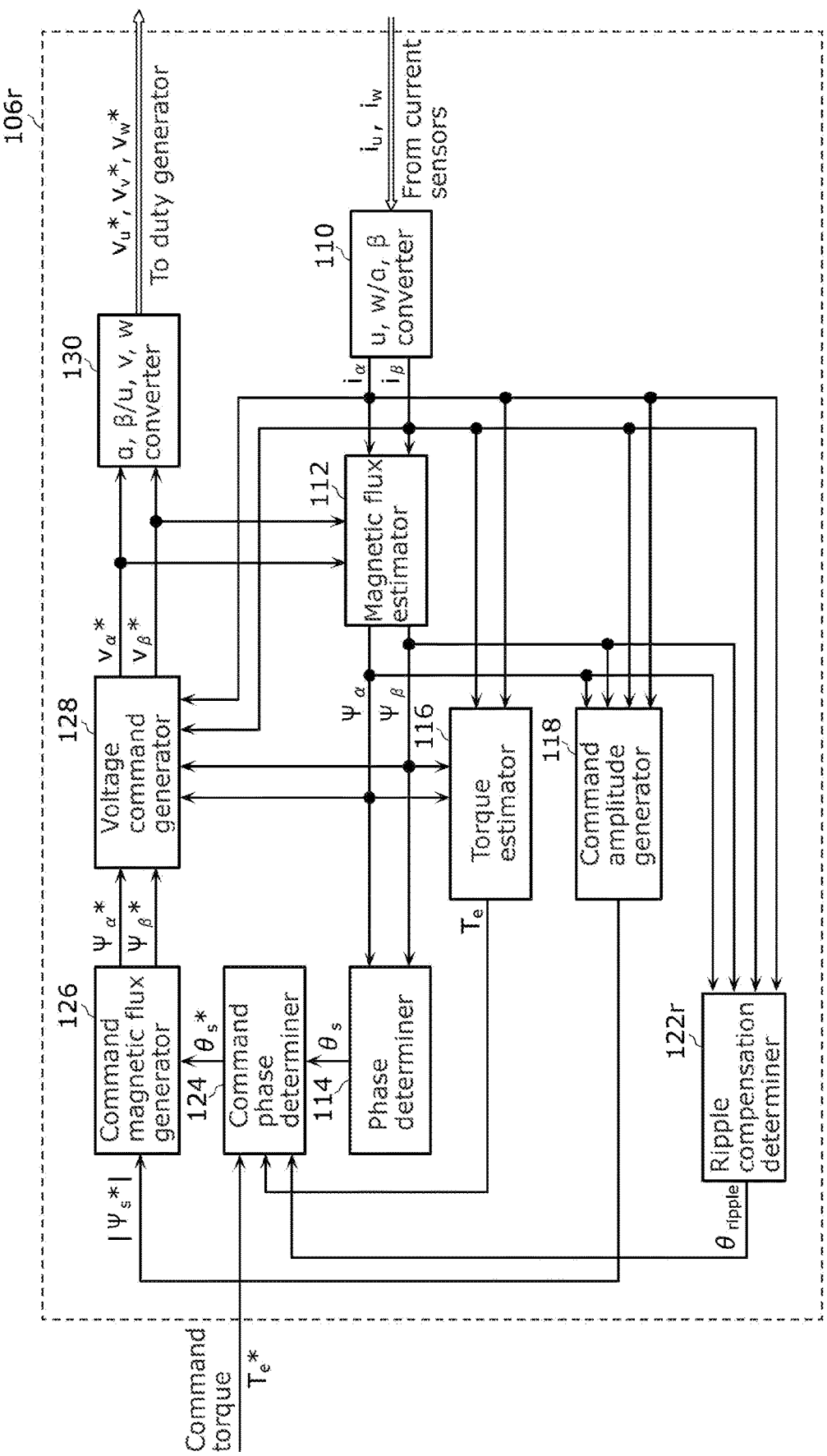
FIG. 34 is a block diagram of a position sensorless controller included in the rotary machine control device shown in FIG. 33.

As shown in FIG. 34, position sensorless controller 106r is configured by replacing magnetization characteristics determiner 120 and ripple compensation determiner 122 of position sensorless controller 106 with ripple compensation determiner 122r.

Figure 35:
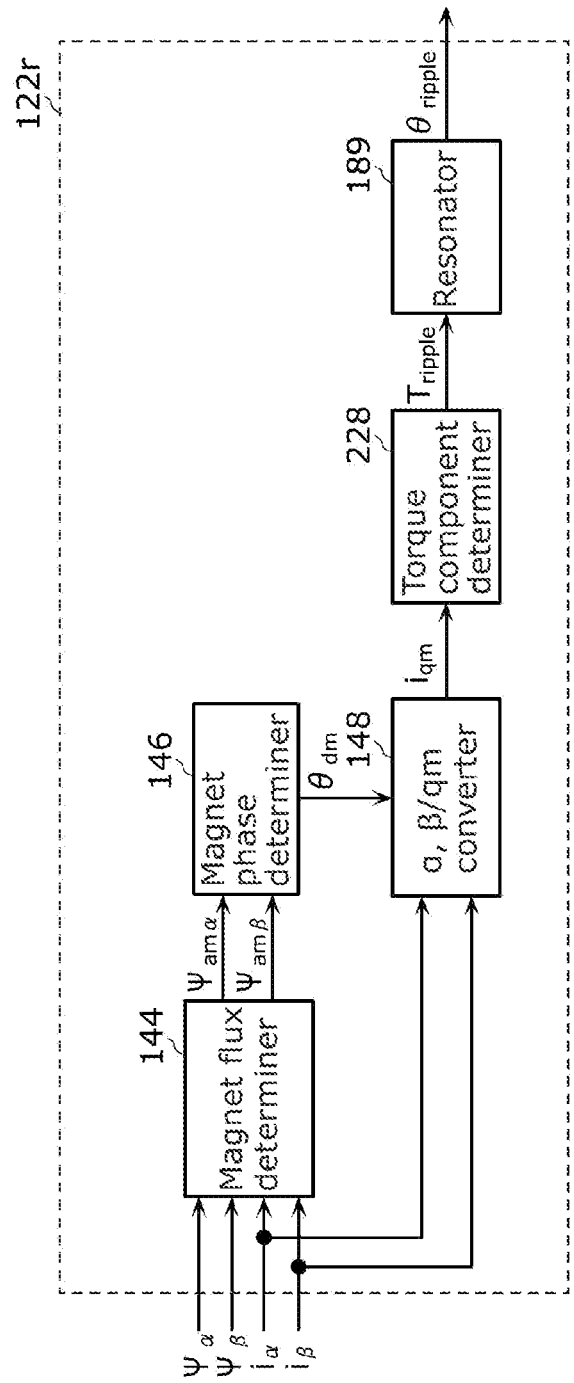
FIG. 35 is a block diagram of a ripple compensation determiner included in the position sensorless controller shown in FIG. 34.

As shown in FIG. 35, ripple compensation determiner 122r determines magnet phase $\theta_{dm}$ that is the phase of magnet flux $\Psi_{am}$ based on estimated magnetic flux $\Psi_s$ and detection current i, and also determines ripple compensation phase $\theta_{ripple}$, by using resonator 189, based on ripple compensation torque $T_{ripple}$ that includes the pulsation of qm-axis current $i_{qm}$ of detection current i by using a dm-qm coordinate system with the dm axis representing magnet phase $\theta_{dm}$ and the qm axis representing a phase shifted by 90 degrees from magnet phase $\theta_{dm}$. Specifically, ripple compensation determiner 122r determines magnet phase $\theta_{dm}$ that is the phase of magnet flux $\Psi_{am}$ based on estimated magnetic flux $\Psi_s$ and detection current i. Then, ripple compensation determiner 122r determines qm-axis current $i_{qm}$ of detection current i by using a dm-qm coordinate system with the dm axis representing magnet phase $\theta_{dm}$ and the qm axis representing a phase shifted by 90 degrees from magnet phase $\theta_{dm}$. Then, ripple compensation determiner 122r determines ripple compensation torque $T_{ripple}$ that includes the pulsation of qm-axis current $i_{qm}$ of detection current i. Then, ripple compensation determiner 122r determines ripple compensation phase $\theta_{ripple}$, by using resonator 189, based on ripple compensation torque $T_{ripple}$ that includes the pulsation of qm-axis current $i_{qm}$ of detection current i. Ripple compensation determiner 122r includes magnet flux determiner 144, magnet phase determiner 146, α, β/qm converter 148, torque component determiner 228, and resonator 189.

Torque component determiner 228 determines ripple compensation torque $T_{ripple}$ that includes the pulsation of qm-axis current $i_{qm}$. Specifically, torque component determiner 228 determines ripple compensation torque $T_{ripple}$ that includes the pulsation of qm-axis current $i_{qm}$ by using Equation (27).

[Math. 27]

$$T_{ripple} = \Psi_{am} i_{qm} \tag{27}$$

Resonator 189 determines ripple compensation phase $\theta_{ripple}$ based on ripple compensation torque $T_{ripple}$ that includes the pulsation of qm-axis current $i_{qm}$. Specifically, resonator 189 determines ripple compensation phase $\theta_{ripple}$ based on ripple compensation torque $T_{ripple}$ that includes the pulsation of qm-axis current $i_{qm}$ by using Equation (28). Here, $b_0$ represents a coefficient, and is a preset constant. Also, $\xi$ represents a damping coefficient, $\omega_n$ represents a natural frequency, and s represents a transfer function.

[Math. 28]

$$\theta_{ripple} = \frac{b_0}{s^2 + 2\xi\omega_n s + \omega_n^2} T_{ripple} \tag{28}$$

In the manner as described above, resonator 189 determines ripple compensation phase $\theta_{ripple}$ based on ripple compensation torque $T_{ripple}$ that includes the pulsation of qm-axis current $i_{qm}$. For example, resonator 189 is a resonator device.

For example, position sensorless controller 106r may include command amplitude generator 118a instead of command amplitude generator 118. Also, for example, position sensorless controller 106r may include, instead of command phase determiner 124, command phase determiner 124c, command phase determiner 124d, command phase determiner 124e, command phase determiner 124f, command phase determiner 124g, or command phase determiner 124h, and command speed $\omega_{ref}^*$ may be input to position sensorless controller 106r.

Figure 36:
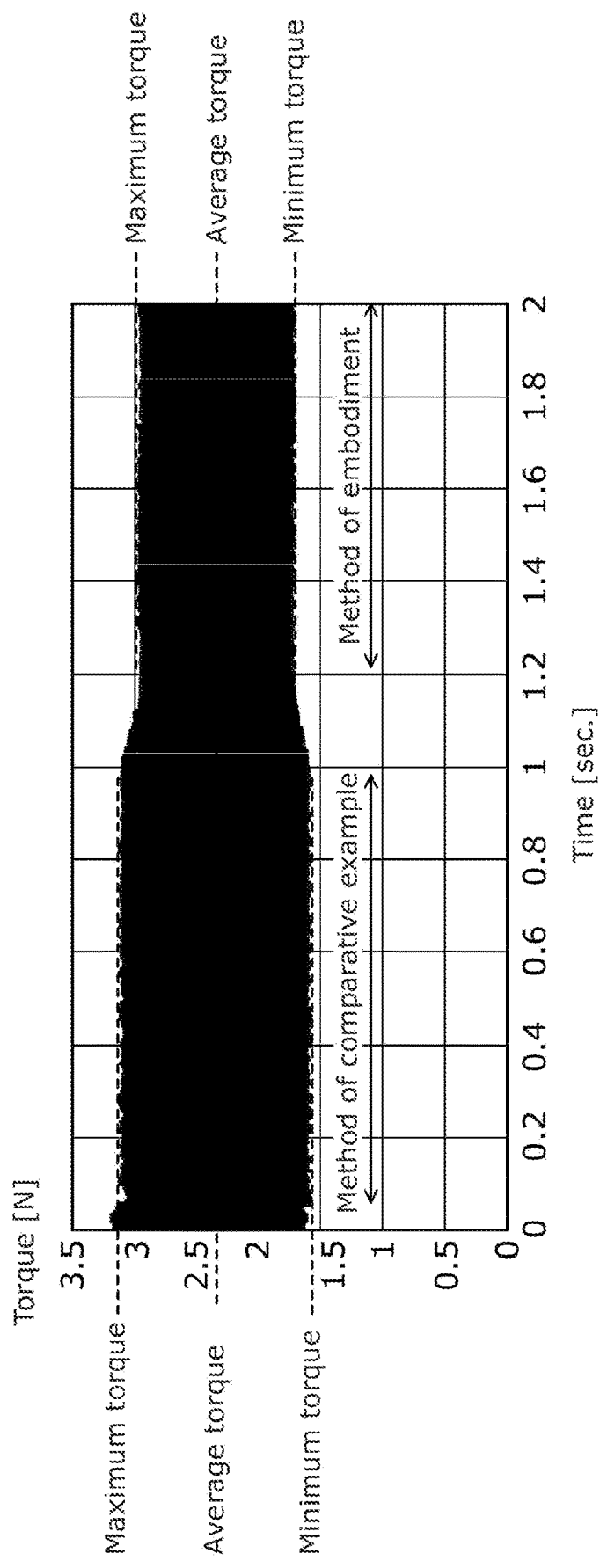
FIG. 36 is a graph showing a torque waveform in a rotary machine.

FIG. 36 is a graph showing a torque waveform in a rotary machine. Specifically, FIG. 36 is a graph showing the torque of a rotary machine obtained by simulating control on the rotary machine by using a rotary machine control device. In this example, the rotary machine was controlled by driving the rotary machine control device in accordance with a method according to a comparative example, and thereafter, the rotary machine was controlled by driving the rotary machine control device in accordance with a method according to an embodiment. As the rotary machine, a motor whose magnet flux has a harmonic component was used, and the rotary machine was controlled to cause the rotation speed to be 3600 r/min and 50% of the rated load. The method of the comparative example is the same method as the method disclosed in NPL 1, and the method according to the embodiment is the same method as the method performed by rotary machine control device 100r.

As shown in FIG. 36, when the rotary machine control device was driven by using the method of the embodiment, it was possible to reduce the torque ripple rate by about 22% as compared with that of when the rotary machine control device was driven by using the method of the comparative example. The torque ripple rate is determined by (maximum torque-minimum torque)/average torque.

Also, when the rotary machine control device was driven by using the same method as the method performed by rotary machine control device 100 of Embodiment 1, and when the rotary machine control device was driven by using the same method as the method performed by rotary machine control device 100j of Embodiment 10 as well, it was possible to reduce the torque ripple rate as compared with that of when the rotary machine control device was driven by using the method of the comparative example.

Advantageous Effects, etc.

Rotary machine control device 100r according to Embodiment 19 includes: magnetic flux estimator 112 that estimates a rotary machine magnetic flux that is a flux of synchronous rotary machine 400; command amplitude generator 118 that generates command amplitude $|\Psi_s^*|$ that is an amplitude of command magnetic fluxes $\Psi_\alpha^*$ and We* by executing feedback control that uses a first inner product or a second inner product, the first inner product being a product of estimated magnetic flux $\Psi_s$ that is the estimated rotary machine magnetic flux and detection current i of synchronous rotary machine 400, the second inner product being a product of detection current i and estimated magnet flux $\Psi_{am}$ of a permanent magnet included in synchronous rotary machine 400; ripple compensation determiner 122r that determines magnet phase $\theta_{dm}$ that is a phase of magnet flux $\Psi_{am}$ based on estimated magnetic flux $\Psi_s$ and detection current i, and also determines ripple compensation phase $\theta_{ripple}$ by using resonator 189 based on ripple compensation torque $T_{ripple}$ that includes the pulsation of qm-axis current $i_{qm}$ of detection current I by using a dm-qm coordinate system with the dm axis representing magnet phase $\theta_{dm}$ and the qm axis representing a phase shifted by 90 degrees from magnet phase $\theta_{dm}$; command phase determiner 124 that determines command phase $\theta_s^*$ based on ripple compensation phase $\theta_{ripple}$ and a torque command or a rotation speed command; and command magnetic flux generator 126 that generates command magnetic fluxes $\Psi_\alpha^*$ and $\Psi_\beta^*$ based on command amplitude $|\Psi_s^*|$ and command phase $\theta_s^*$.

With this configuration, magnet phase $\theta_{dm}$ can be determined; qm-axis magnetic flux $\Psi_{qm}$ of estimated magnetic flux $\Psi_s$ and qm-axis current $i_{qm}$ of detection current i can be determined by using a dm-qm coordinate system with the dm axis representing magnet phase $\theta_{dm}$ and the qm axis representing a phase shifted by 90 degrees from magnet phase $\theta_{dm}$; ripple compensation phase $\theta_{ripple}$ can be determined based on ripple compensation torque $T_{ripple}$ that includes the pulsation of qm-axis current $i_{qm}$ of detection current i; and command phase $\theta_s^*$ can be determined based on ripple compensation phase $\theta_{ripple}$ and a torque command or a rotation speed command. Accordingly, in the position sensorless magnetic flux control, the torque ripple can be effectively reduced.

Other Embodiments, etc.

The rotary machine control device according to one or more aspects of the present disclosure has been described above based on Embodiments 1 to 19. However, the present disclosure is not limited to these embodiments. Other embodiments obtained by making various modifications that can be conceived by a person having ordinary skill in the art to the above embodiments as well as embodiments constructed by combining structural elements of different embodiments without departing from the scope of the present disclosure are also included within the scope of the one or more aspects of the present disclosure.

In Embodiment 1 described above, an example has been described in which rotary machine control device 100 includes torque estimator 116 and phase determiner 114. However, the configuration is not limited thereto. For example, the rotary machine control device does not necessarily need to include torque estimator 116 and phase determiner 114. In this case, for example, the rotary machine control device may acquire estimated torque $T_e$ and estimated phase $\theta_s$ from the outside. Also, for example, as shown in FIG. 16, command phase $\theta_s^*$ may be determined without using estimated torque $T_e$ and estimated phase $\theta_s$.

Also, in Embodiment 1, an example has been described in which rotary machine control device 100 includes torque estimator 116, but the configuration is not limited thereto. For example, the rotary machine control device does not necessarily need to include torque estimator 116. In this case, for example, the rotary machine control device may acquire estimated torque $T_e$ from outside. Also, for example, as shown in FIG. 17, command phase $\theta_s^*$ may be determined without using estimated torque $T_e$. The same applies to Embodiments 2 to 9.

In the embodiments described above, the structural elements may be configured by using dedicated hardware, or may be implemented by executing a software program suitable for the structural elements. The structural elements may be implemented by a program executor such as a CPU (Central Processing Unit) or a processor reading and executing a software program recorded in a recording medium such as a hard disk or a semiconductor memory.

The present disclosure also encompasses the following cases.

(1) Each of the devices described above is, specifically, a computer system that includes a microprocessor, a ROM, a RAM, a hard disk unit, a display unit, a keyboard, a mouse, and the like. A computer program is stored in the RAM or the hard disk unit. The functions of the device are implemented as a result of the microprocessor operating in accordance with the computer program. Here, the computer program is composed of a combination of a plurality of instruction codes that indicate instructions for the computer to achieve predetermined functions.

(2) Some or all of the structural elements that constitute each of the devices described above may be composed of a single system LSI (Large Scale Integration). The system LSI is a super multifunctional LSI manufactured by integrating a plurality of structural elements on a single chip, and is specifically a computer system that includes a microprocessor, a ROM, a RAM, and the like. A computer program is stored in the RAM. The functions of the system LSI are implemented as a result of the microprocessor operating in accordance with the computer program.

(3) Some or all of the structural elements that constitute each of the devices described above may be composed of an IC card or a single module that can be attached and detached to and from the device. The IC card or the module is a computer system that includes a microprocessor, a ROM, a RAM, and the like. The IC card or the module may include the above-described super multifunctional LSI. The functions of the IC card or the module are implemented as a result of the microprocessor operating in accordance with a computer program. The IC card or the module may have tamper resistance.

(4) The present disclosure may be any of the methods described above. Alternatively, the present disclosure may be a computer program that implements any of the methods by using a computer, or may be a digital signal generated by the computer program.

Also, the present disclosure may be implemented by recording the computer program or the digital signal in a computer readable recording medium such as, for example, a flexible disk, a hard disk, a CD-ROM, a MO, a DVD, a DVD-ROM, a DVD-RAM, a BD (Blu-ray (registered trademark) Disc), or a semiconductor memory. Also, the present disclosure may be the digital signal recorded in the recording medium.

Also, the present disclosure may be implemented by transmitting the computer program or the digital signal via a telecommunication line, a wireless or wired communication line, a network as typified by the Internet, data broadcasting, or the like.

Also, the present disclosure may be a computer system that includes a microprocessor and a memory. The memory stores the computer program described above, and the microprocessor may operate in accordance with the computer program.

Also, the present disclosure may be implemented by another independent computer system by recording the program or the digital signal on the recording medium and transferring the program or the digital signal, or by transferring the program or the digital signal via the network described above or the like.

(5) The embodiments and other embodiments described above may be combined.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2021-203816 filed on Dec. 16, 2021, Japanese Patent Application No. 2021-203968 filed on Dec. 16, 2021, and Japanese Patent Application No. 2022-085836 filed on May 26, 2022.

INDUSTRIAL APPLICABILITY

The present invention is widely applicable to a rotary machine control device that controls a rotary machine, and the like.

The invention claimed is:

1. A rotary machine control device comprising:
a magnetic flux estimator that estimates a rotary machine magnetic flux that is a magnetic flux of a synchronous rotary machine;
a command amplitude generator that generates a command amplitude that is an amplitude of a command magnetic flux by executing feedback control that uses a first inner product or a second inner product, the first inner product being a product of an estimated magnetic flux that is the rotary machine magnetic flux estimated and a detection current of the synchronous rotary machine, the second inner product being a product of the detection current and an estimated magnet flux of a permanent magnet included in the synchronous rotary machine;
a magnetization characteristics determiner that determines a magnet phase that is a phase of the magnet flux based on the estimated magnetic flux and the detection current, and also determines a qm-axis magnetic flux of the estimated magnetic flux, a qm-axis current of the detection current, and a harmonic component of the magnet phase by using a dm-qm coordinate system with a dm axis representing the magnet phase and a qm axis representing a phase shifted by 90 degrees from the magnet phase;
a ripple compensation determiner that determines a ripple compensation phase by using a ripple compensation torque obtained based on the qm-axis current and the harmonic component;
a command phase determiner that determines a command magnetic flux vector phase based on (i) the ripple compensation phase and (ii) a torque command or a rotation speed command; and
a command magnetic flux generator that generates the command magnetic flux based on the command amplitude and the command magnetic flux vector phase.

2. The rotary machine control device according to claim 1, further comprising:
a phase determiner that determines an estimated phase based on the estimated magnetic flux, the estimated phase being a phase of the estimated magnetic flux; and
a torque estimator that computes an estimated torque based on the estimated magnetic flux and the detection current,
wherein the command phase determiner determines the command magnetic flux vector phase by adding a torque phase for converging the estimated torque on a command torque, the ripple compensation phase, and the estimated phase.

3. The rotary machine control device according to claim 1,
wherein the command phase determiner:
(i) determines a movement amount of an estimated phase of the estimated magnetic flux for each control cycle by which the estimated phase needs to move by using the rotation speed command input to the synchronous rotary machine; and
(ii) determines the command magnetic flux vector phase by using the movement amount determined and the ripple compensation phase.

4. The rotary machine control device according to claim 3, further comprising:
a torque estimator that computes an estimated torque based on the estimated magnetic flux and the detection current,
wherein the command phase determiner determines the command magnetic flux vector phase by further using the estimated torque.

5. The rotary machine control device according to claim 1, further comprising:
a phase determiner that determines an estimated phase based on the estimated magnetic flux, the estimated phase being a phase of the estimated magnetic flux,
wherein the command phase determiner:
(i) determines a movement amount of the estimated phase for each control cycle by which the estimated phase needs to move by using the rotation speed command input to the synchronous rotary machine; and
(ii) determines the command magnetic flux vector phase by using the movement amount determined, the ripple compensation phase, and the estimated phase.

6. The rotary machine control device according to claim 5, further comprising:
a torque estimator that computes an estimated torque based on the estimated magnetic flux and the detection current,
wherein the command phase determiner determines the command magnetic flux vector phase by further using the estimated torque.

7. The rotary machine control device according to claim 1,
wherein the command amplitude generator sets a target value of a result of computation of the first inner product or the second inner product to zero.

8. A rotary machine control device comprising:
a magnetic flux estimator that estimates a rotary machine magnetic flux that is a magnetic flux of a synchronous rotary machine;
a command amplitude generator that generates a command amplitude that is an amplitude of a command magnetic flux by executing feedback control that uses a first inner product or a second inner product, the first inner product being a product of an estimated magnetic flux that is the rotary machine magnetic flux estimated and a detection current of the synchronous rotary machine, the second inner product being a product of the detection current and an estimated magnet flux of a permanent magnet included in the synchronous rotary machine;

a magnetization characteristics determiner that determines a magnet phase that is a phase of the magnet flux based on the estimated magnetic flux and the detection current, and also determines a qm-axis magnetic flux of the estimated magnetic flux, a qm-axis current of the detection current, and a harmonic component of the magnet phase by using a dm-qm coordinate system with a dm axis representing the magnet phase and a qm axis representing a phase shifted by 90 degrees from the magnet phase;

a ripple compensation determiner that determines a ripple compensation torque based on the qm-axis current and the harmonic component;

a command phase determiner that determines a command magnetic flux vector phase based on (i) a ripple compensation phase and (ii) a torque command or a rotation speed command, the ripple compensation phase being determined by a resonator based on the ripple compensation torque; and a command magnetic flux generator that generates the command magnetic flux based on the command amplitude and the command magnetic flux vector phase.

9. The rotary machine control device according to claim 8, further comprising:

a phase determiner that determines an estimated phase based on the estimated magnetic flux, the estimated phase being a phase of the estimated magnetic flux; and a torque estimator that computes an estimated torque based on the estimated magnetic flux and the detection current, wherein the command phase determiner determines the command magnetic flux vector phase by adding a torque phase for converging the estimated torque on a command torque, the ripple compensation phase, and the estimated phase.

10. The rotary machine control device according to claim 8, wherein the command phase determiner:
(i) determines a movement amount of an estimated phase of the estimated magnetic flux for each control cycle by which the estimated phase needs to move by using the rotation speed command input to the synchronous rotary machine; and
(ii) determines the command magnetic flux vector phase by using the movement amount determined and the ripple compensation phase.

11. The rotary machine control device according to claim 8, further comprising:

a phase determiner that determines an estimated phase based on the estimated magnetic flux, the estimated phase being a phase of the estimated magnetic flux, wherein the command phase determiner:
(i) determines a movement amount of the estimated phase for each control cycle by which the estimated phase needs to move by using the rotation speed command input to the synchronous rotary machine; and
(ii) determines the command magnetic flux vector phase by using the movement amount determined, the ripple compensation phase, and the estimated phase.

12. The rotary machine control device according to claim 8, wherein the command amplitude generator sets a target value of a result of computation of the first inner product or the second inner product to zero.

13. A rotary machine control device comprising:

a magnetic flux estimator that estimates a rotary machine magnetic flux that is a magnetic flux of a synchronous rotary machine;

a command amplitude generator that generates a command amplitude that is an amplitude of a command magnetic flux by executing feedback control that uses a first inner product or a second inner product, the first inner product being a product of an estimated magnetic flux that is the rotary machine magnetic flux estimated and a detection current of the synchronous rotary machine, the second inner product being a product of the detection current and an estimated magnet flux of a permanent magnet included in the synchronous rotary machine;

a ripple compensation determiner that determines a magnet phase that is a phase of the magnet flux based on the estimated magnetic flux and the detection current, and also determines a ripple compensation phase by using a resonator based on a ripple compensation torque that includes a pulsation of a qm-axis current of the detection current by using a dm-qm coordinate system with a dm axis representing the magnet phase and a qm axis representing a phase shifted by 90 degrees from the magnet phase;

a command phase determiner that determines a command magnetic flux vector phase based on (i) the ripple compensation phase and (ii) a torque command or a rotation speed command; and a command magnetic flux generator that generates the command magnetic flux based on the command amplitude and the command magnetic flux vector phase.

14. The rotary machine control device according to claim 13, further comprising:

a phase determiner that determines an estimated phase based on the estimated magnetic flux, the estimated phase being a phase of the estimated magnetic flux; and a torque estimator that computes an estimated torque based on the estimated magnetic flux and the detection current, wherein the command phase determiner determines the command magnetic flux vector phase by adding a torque phase for converging the estimated torque on a command torque, the ripple compensation phase, and the estimated phase.

15. The rotary machine control device according to claim 13, wherein the command phase determiner:
(i) determines a movement amount of an estimated phase of the estimated magnetic flux for each control cycle by which the estimated phase needs to move by using the rotation speed command input to the synchronous rotary machine; and
(ii) determines the command magnetic flux vector phase by using the movement amount determined and the ripple compensation phase.

16. The rotary machine control device according to claim 13, further comprising:
- a phase determiner that determines an estimated phase based on the estimated magnetic flux, the estimated phase being a phase of the estimated magnetic flux, wherein the command phase determiner:
- (i) determines a movement amount of the estimated phase for each control cycle by which the estimated phase needs to move by using the rotation speed command input to the synchronous rotary machine; and
- (ii) determines the command magnetic flux vector phase by using the movement amount determined, the ripple compensation phase, and the estimated phase.

17. The rotary machine control device according to claim 13,
- wherein the command amplitude generator sets a target value of a result of computation of the first inner product or the second inner product to zero.

* * * * *